(12) United States Patent
Son et al.

(10) Patent No.: US 10,796,439 B2
(45) Date of Patent: Oct. 6, 2020

(54) MOTION INFORMATION GENERATING METHOD AND ELECTRONIC DEVICE SUPPORTING SAME

(71) Applicant: Samsung Electronics Co., Ltd., Gyeonggi-do (KR)

(72) Inventors: Dong-Il Son, Gyeonggi-do (KR); Jong-Chul Choi, Gyeonggi-do (KR); Dong-Hyun Yeom, Gyeonggi-do (KR); Cheolho Cheong, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/461,860

(22) PCT Filed: Oct. 20, 2017

(86) PCT No.: PCT/KR2017/011624
§ 371 (c)(1),
(2) Date: May 17, 2019

(87) PCT Pub. No.: WO2018/097483
PCT Pub. Date: May 31, 2018

(65) Prior Publication Data
US 2019/0370981 A1    Dec. 5, 2019

(30) Foreign Application Priority Data
Nov. 23, 2016    (KR) .................. 10-2016-0156259

(51) Int. Cl.
*G06T 7/246* (2017.01)
*H04N 5/04* (2006.01)

(52) U.S. Cl.
CPC .............. *G06T 7/248* (2017.01); *H04N 5/04* (2013.01)

(58) Field of Classification Search
None
See application file for complete search history.

(56) References Cited

U.S. PATENT DOCUMENTS

| | | | |
|---|---|---|---|
| 2008/0246759 A1 | 10/2008 | Summers | |
| 2011/0044604 A1* | 2/2011 | Brokken | G06F 3/016 386/239 |

FOREIGN PATENT DOCUMENTS

| | | |
|---|---|---|
| KR | 10-2012-0006806 A | 1/2012 |
| KR | 10-2013-0001530 A | 1/2013 |
| KR | 10-1556721 B1 | 10/2015 |
| WO | 2015/030482 A1 | 3/2015 |
| WO | 2015/064991 A2 | 5/2015 |

* cited by examiner

*Primary Examiner* — Samira Monshi
(74) *Attorney, Agent, or Firm* — Cha & Reiter, LLC.

(57) ABSTRACT

A method according to various embodiments of the present invention can comprise: detection of content; detection of the progressing direction of an image comprised in the content with respect to the detection of the content; detection of a reference area comprising the detected progressing direction of the image; determination of a reference object in the detected reference area; and generation of motion information, for controlling the operation of an external electronic device, on the basis of the determined reference object.

18 Claims, 18 Drawing Sheets

MOTION INFORMATION GENERATING METHOD AND ELECTRONIC DEVICE SUPPORTING SAME

CLAIM OF PRIORITY

This application is a National Phase Entry of PCT International Application No. PCT/KR2017/011624, which was filed on Oct. 20, 2017, and claims a priority to Korean Patent Application No. 10-2016-0156259, which was filed on Nov. 23, 2016, the contents of which are incorporated herein by reference.

TECHNICAL FIELD

Various embodiments of the disclosure relate to a motion information generation method and an electronic device supporting the same.

BACKGROUND ART

In recent years, various electronic devices directly wearable on bodies are developing. Such a wearable electronic device may include, for example, a head-mounted display (HMD), smart glasses, a smart watch, a smart wristband, a contact lens-like device, a ring-like device, a shoe-like device, an apparel-like device, a glove-like device, or the like. The wearable electronic device may be connected with a simulation device and so can provide a content that enables a user to experience operations implemented in an image.

DISCLOSURE OF INVENTION

Technical Problem

A related-art electronic device (for example, a head-mounted electronic device) providing a three-dimensional (3D) image (for example, a virtual reality content), and a simulation device providing a physical effect to a user are executable, being limited to a content including motion information. For example, to let the simulation device that a user rides in be moved while a 3D image is being displayed, a roller coaster experience image having motion information inserted into each frame should be provided. Accordingly, when a content without motion information is reproduced, a physical effect cannot be provided to the user even if the head-mounted electronic device is connected with the simulation device.

Various embodiments of the disclosure relate to a method for generating motion information in a content and providing the motion information to a simulation device, and an electronic device supporting the same.

The technical objects to be achieved by the disclosure are not limited to the above-mentioned object, and other technical objects that have not been mentioned can be clearly understood by a person skilled in the art based on the following descriptions.

Solution to Problem

A method according to various embodiments of the disclosure may include: detecting a content; detecting a progressing direction of an image included in the content as the content is detected; detecting a reference region including the detected progressing direction of the image; determining a reference object in the detected reference region; and generating motion information for controlling driving of an external electronic device, based on the determined reference object.

A method according to various embodiments of the disclosure may include: detecting a content; detecting a progressing direction of an image included in the content as the content is detected; detecting a reference region including the detected progressing direction of the image; determining a reference object in the detected reference region; and generating motion information for controlling driving of an external electronic device, based on the determined reference object.

An electronic device according to various embodiments of the disclosure may include: a communication module functionally connected to the electronic device; and a processor, and the processor may detect a content, detect a progressing direction of an image included in the content as the content is detected, detect a reference region including the detected progressing direction of the image, determine a reference object in the detected reference region, and generate motion information for controlling driving of an external electronic device, based on the determined reference object.

Advantageous Effects of Invention

The method for generating motion information and the electronic device supporting the same according to various embodiments of the disclosure can generate motion information and provide the motion information to a simulation device in real time at the same time as executing a content, and can provide a reality-maximized content to a user. In addition, the user can receive a physical effect from the simulation device at the same time as wearing a head-mounted electronic device.

BEST MODE FOR CARRYING OUT THE INVENTION

Figure 1:
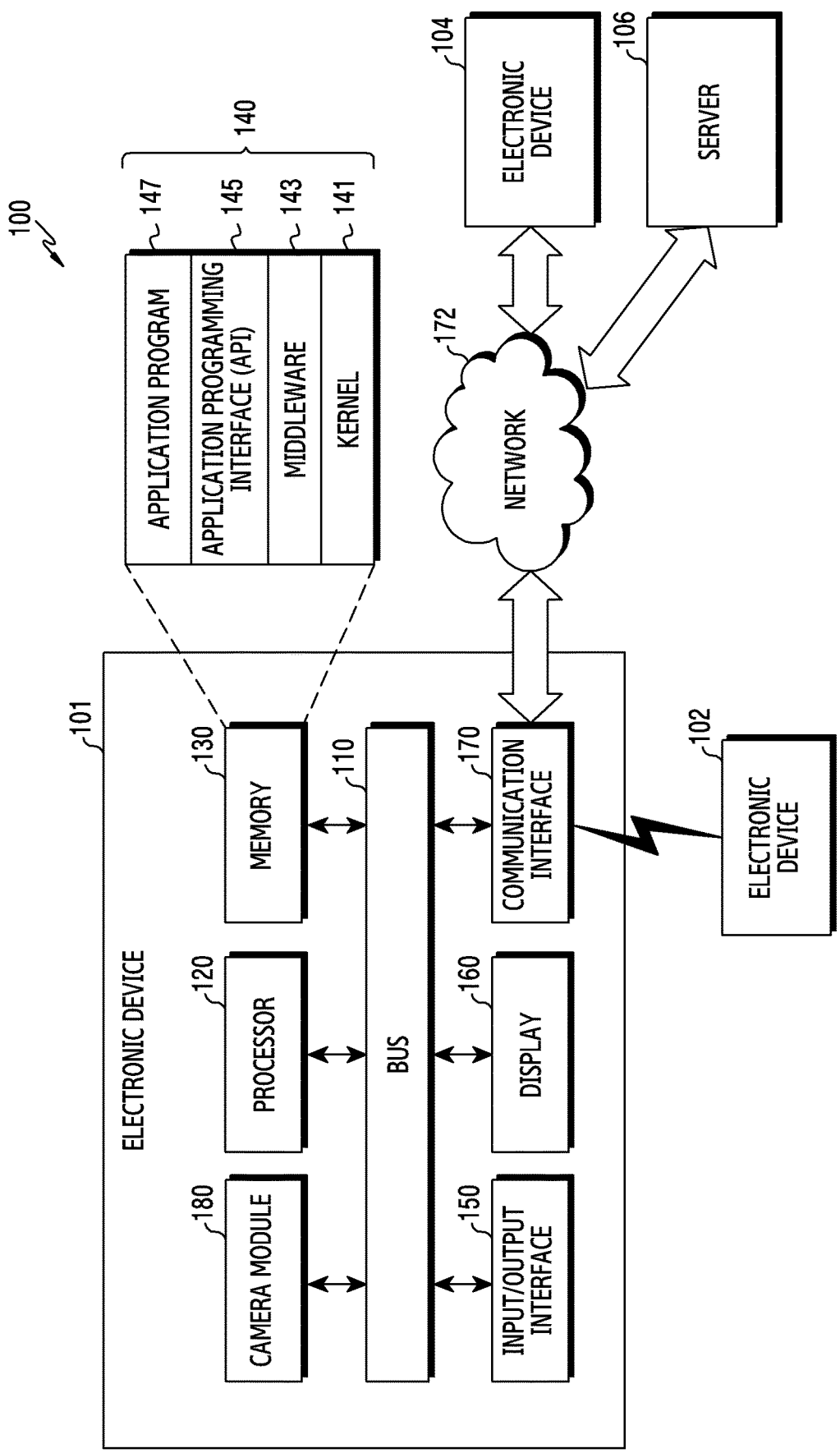
FIG. 1 is a view illustrating an environment of a network including an electronic device according to various embodiments of the disclosure.

Hereinafter, various embodiments of the disclosure will be described with reference to the accompanying drawings. It should be appreciated that various embodiments and the terms used therein are not intended to limit the technological features set forth herein to particular embodiments, and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B" or "at least one of A and/or B" may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via another element (e.g., a third element).

The term "configured (or set) to . . . " used in the disclosure may be interchangeably used with the terms "suitable for . . . ," "having the capacity to . . . ," "adapted to . . . ," "made to . . . ," "capable of . . . ," or "designed to . . . " in a hardware or software level depending on the situation. In a certain situation, the term "a device configured to . . . " may refer to "the device being capable of . . . " with another device or parts. For example, "a processor configured (set) to perform A, B, and C" may refer, for example, and without limitation, to a dedicated processor (for example, an embedded processor) for performing a corresponding operation, or a generic-purpose processor (for example, a central processing unit (CPU) or an application processor (AP)), or the like, for performing corresponding operations by executing one or more software programs stored in a memory device.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistant (PDAs), portable multimedia players (PMPs), Motion Picture Experts Group (MPEG-1 or MPEG-2) Audio Layer 3 (MP3) players, medical devices, cameras, or wearable devices. The wearable devices may include at least one of accessories (for example, watches, rings, bracelets, ankle bracelets, necklaces, glasses, contact lenses, head-mounted-devices (HMDs), etc.), fabric- or clothing-mounted devices (for example, electronic apparels), body-mounted devices (for example, skin pads, tattoos, etc.), or bio-implantable circuits. According to some embodiments, the electronic devices may include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, media boxes (for example, Samsung HomeSync™, Apple TV™, or Google TV™), game consoles (for example, Xbox™ and PlayStation™), electronic dictionaries, electronic keys, camcorders, or electronic picture frames.

According to another embodiment, the electronic devices may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite systems (GNSS), event data recorders (EDRs), flight data recorders (FDRs), vehicle infotainment devices, electronic equipment for vessels (for example, navigation systems and gyrocompasses), avionics, security devices, head units for vehicles, industrial or home robots, drones, automatic teller's machines (ATMs) of financial institutions, points of sales (POSs) of stores, or internet of things (for example, light bulbs, various sensors, sprinkler devices, fire alarms, thermostats, street lamps, toasters, exercise equipment, hot water tanks, heaters, boilers, or the like). According to an embodiment, the electronic devices may include at least one of furniture, a part of buildings/structures or cars, electronic boards, electronic signature receiving devices, projectors, or various measuring instruments (for example, water meters, electricity meters, gas meters, or wave meters). In various embodiments, the electronic devices may be flexible or may be a combination of two or more devices of the above-mentioned devices. Also, electronic devices according to various embodiments of the disclosure are not limited to the above-mentioned devices. In the disclosure, the term "user" may refer to a person who uses the electronic device or a device that uses the electronic device (for example, an artificial intelligence electronic device).

FIG. 1 is a diagram illustrating a network environment including an electronic device according to various embodiments.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to an example embodiment of the present disclosure, the electronic device 101 may omit at least one of the above components or may further include other components. The bus 110 may include, for example, a circuit which interconnects the components 110 to 170 and delivers a communication (e.g., a control message and/or data) between the components 110 to 170. The processor 120 may include various processing circuitry, such as, for example, and without limitation, one or more of a dedicated processor, a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140.

The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data. Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto. The API 145 is an interface through which the applications 147 control functions provided from the kernel 141 or the middleware 143, and may include, for example, at least one interface or function (e.g., instruction) for file control, window control, image processing, character control, and the like. The input/output interface 150, for example, may include various input/output circuitry and function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry and may establish communication, for example, between the electronic device 101 and an external device (e.g., a first external electronic device 102, a second external electronic device 104, or a server 106). For example, the communication interface 170 may be connected to a network 172 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In an one embodiment, the wireless communication may include at least one of, for example, Wi-Fi, Bluetooth, Zigbee, Near Field Communication (NFC), Magnetic Secure Transmission, Radio Frequency or Body Area Network (BAN). In an one embodiment, the wireless communication may include Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS).

The camera module 180 may capture a still image or moving images. According to an embodiment, the camera module 180 may include one or more lenses, image sensors, image signal processors, or flashes.

The network 172 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
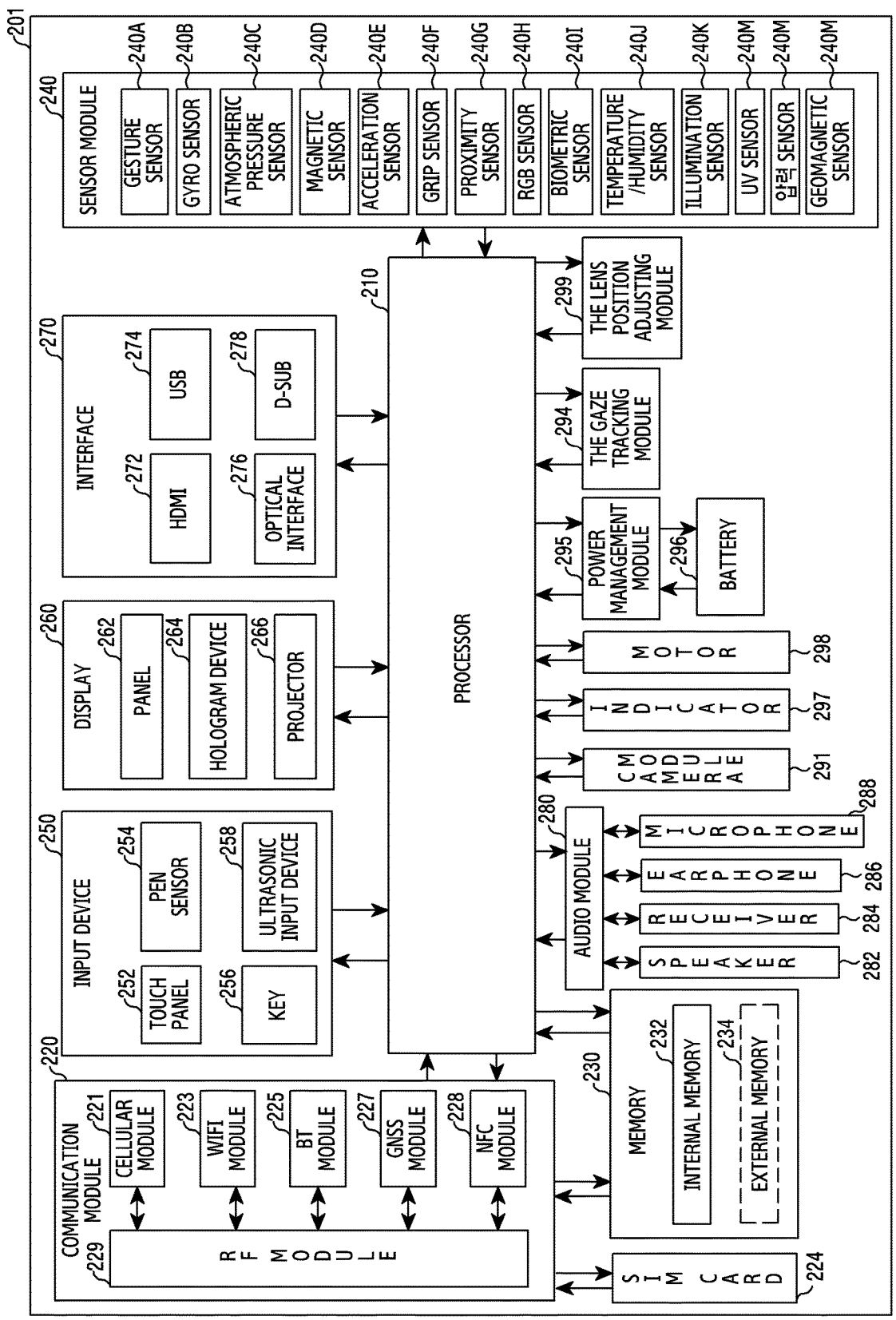
FIG. 2 is a block diagram of an electronic device according to various embodiments of the disclosure.

FIG. 2 is a block diagram illustrating an example electronic device according to various example embodiments of the present disclosure.

The electronic device 201 may include, for example, all or a part of the electronic device 101 illustrated in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module (e.g., including a camera) 291, a power management module 295, a battery 296, an indicator 297, and a motor 298.

The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229. The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP). According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package. The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module. The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like). The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state. The head wearable electronic device may sense wearing of user by using the gyro sensor 240B, the acceleration sensor 240E, the geomagnetic sensor 240P, the proximity sensor 240G or the grip sensor 240F.

According to an embodiment, the head mountable electronic device 201 may detect whether a user wears the head mountable electronic device 201 by detecting at least one of IR recognition, pressure recognition and variation of capacitance (or dielectric constant) according to wear of the user. The gesture sensor 240A may detects motion of the user's hand or finger and may receive the motion as an input operation of the head mountable electronic device 201. Additionally or alternatively, the sensor module 240 may recognizes biometric information of the user by using at least one of a biometric recognition sensor, for example, E-nose sensor, electromyography sensor (EMG sensor), electroencephalogram sensor (EEG sensor), electrocardiogram sensor (ECG sensor), iris sensor, refraction sensor. The sensor module 240A may further includes a controller circuit configured to control one or more sensors included in the sensor module 240A.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user. The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, a projector 266 and/or a controlling circuit to control thereof. The panel 262 may be implemented to be, for example, flexible, transparent, or wearable. The panel 262 may be embodied as a single module with the touch panel 252. The panel 262 may includes at least one of LCD (Liquid Crystal Display), OLED (Organic Light Emitting Diodes), electronic ink or EWD (Electron Wetting Display). The display 260 may have the property of transmitting light (e.g., the display having a light transmittance). For example, the display 260 having the light transmittance may be implemented by arranging a plurality of transparent area or translucent area for penetrating a light with a plurality of pixels. Herein, the display 260 having the light transmittance may be implemented by arranging the plurality of pixels with the plurality of perforated holes for penetrating a light. The hologram device 264 may show a three dimensional (3D) image in the air by using an interference of light. The projector 266 may project light onto a screen to display an image. The screen may be located, for example, in the interior of or on the exterior of the electronic device 201. The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288. The camera module 291 may include various circuitry including, for example, and without limitation, a camera, a device which may photograph a still image and a video, or the like. According to an embodiment of the present disclosure, the camera module 291 may include one or more image sensors (e.g., a front sensor or a back sensor), a lens, an Image Signal Processor (ISP) or a flash (e.g., LED or xenon lamp). The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

The gaze tracking module 294 may track the user's gaze using, for example, at least one of EOG sensor (Electircal oculography), Coil systems, Dual purkinje systems, Bright pupil systems, Dark pupil systems. In one embodiment, the gaze tracking module 294 may further comprises a micro camera for gaze tracking.

The lens position adjusting module 299 may arrange the lens to be overlapped with the display 260 so that the user may see an image of the display 260 through the lens. In one embodiment, the lens position adjusting module 299 may moves the lens to a position where the lens is not overlapped with the display 260. In one embodiment, the lens position adjusting module 299 may adjusts a position of the lens so that the user may see the image suitable for his/her own visual acuity. For example, the lens position adjusting module 299 may perform a refraction test on the user's eye, and adjusts the position of the lens according to the result of the refraction test. In one embodiment, the lens position adjusting module 299 may adjusts the position of the lens by estimating inter-pupil distance (IPD) of the user.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
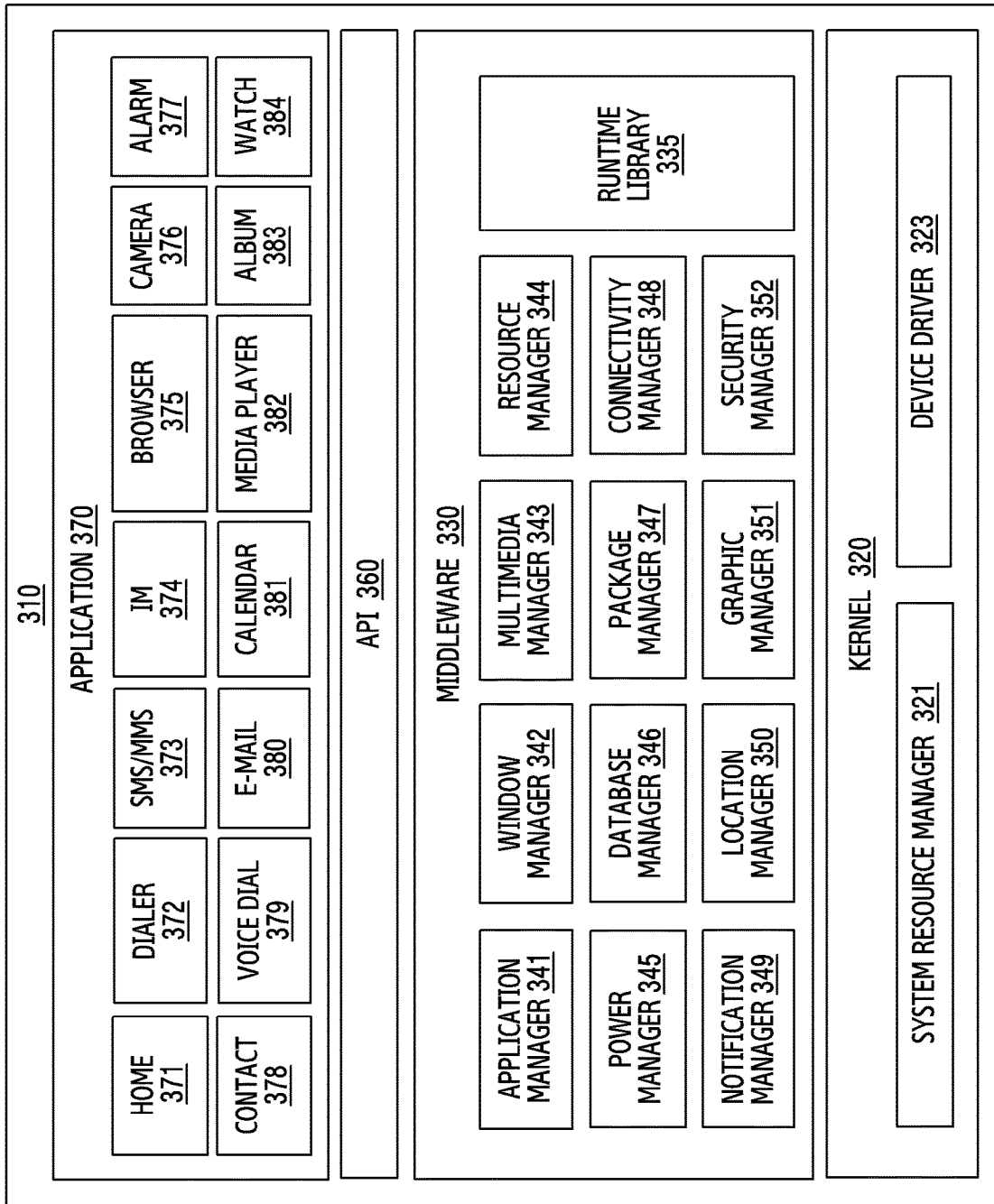
FIG. 3 is a block diagram of a program module according to various embodiments.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like. According to FIG. 3, the program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. For example, the middleware 330 may provide a function required in common by the applications 370, or may provide various functions to the applications 370 through the API 360 so as to enable the applications 370 to efficiently use the limited system resources in the electronic device. According to an example embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like. The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370. The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device. The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components. The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, a contact 378, a voice dial 379, an email 380, a calendar 381, a media player 382, an album 383, a watch 384. According to various example embodiments, the application 370 may include an application for providing a health care (e.g., for measuring exercise quantity or blood sugar, etc.), or environment information (e.g., providing atmospheric pressure, humidity, or temperature information). According to an embodiment, the applications 370 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device. For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user. The device management application may install, delete, or update, for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device. According to an embodiment, the applications 370 may include applications (for example, a health care application of a mobile medical appliance, and the like) designated according to the attributes of an external electronic device. According to an embodiment, the applications 370 may include applications received from an external electronic device. At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

As used herein, the term "module" may include a unit implemented in hardware, software, or firmware, and for example, may interchangeably be used with other terms "logic," "logic block," "part" or "circuitry". A "module" may be a single integral component, or a minimum unit or part thereof, adapted to perform one or more functions. A "module" may be implemented mechanically or electronically. For example, a "module" may include an application-specific integrated circuit (ASIC) chip, field-programmable gate arrays (FPGAs), or a programmable-logic device for performing some operations, which are known or will be developed. At least part of a device (for example, modules or functions thereof) or a method (for example, operations) according to various embodiments may be implemented by instructions stored in a computer-readable storage medium (for example, the memory 130) in the form of a program module. When the instruction is executed by a processor (for example, the processor 120), the processor may perform a function corresponding to the instruction. The computer-readable recording medium may include a hard disk, a floppy disk, magnetic media (for example, a magnetic tape), optical media (for example, compact disc read only memory (CD-ROM) and a digital versatile disc (DVD), magneto-optical media (for example, a floptical disk)), or an internal memory. Also, the instruction may include a code generated by a compiler or a code executable by an interpreter. The module or program nodule according to various embodiments may include one or more of the above-described elements, some element may be omitted, or other element(s) may further be included. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, an electronic device may include: a communication module functionally connected to the electronic device; and a processor. The processor may detect a content, detect a progressing direction of an image included in the content as the content is detected, detect a reference region including the detected progressing direction of the image, determine a reference object in the detected reference region, and generate motion information for controlling driving of an external electronic device, based on the determined reference object.

In an embodiment, the processor may reproduce the detected content as the content is detected.

In an embodiment, the communication module may transmit the motion information to the external electronic device.

In an embodiment, the processor may detect an N frame and an N+1 frame of the image included in the content, detect a plurality of difference motion vectors by comparing the detected N frame and N+1 frame, detect a plurality of difference motion vectors which are symmetrical to each other from among the detected plurality of difference motion vectors, and detect the reference region including the plurality of difference motion vectors which are symmetrical to each other.

In an embodiment, the processor may detect a plurality of objects and a background frame in the reference region, detect a motion of the background frame, detect motion vectors of the plurality of objects and of the background frame as the motion of the background frame is detected, detect at least one object having a motion vector having the opposite direction to the motion vector of the background frame, and determine one of the at least one object having the motion vector having the opposite direction to the motion vector of the background frame, as the reference object.

In an embodiment, the processor may replace the determined reference object with another object of the at least one object having the motion vector having the opposite direction to the motion vector of the background frame as the image progresses.

In an embodiment, the processor may detect a plurality of objects and a background frame in the reference region, detect motion vectors of the detected plurality of objects and of the background frame, determine whether there is at least one object having a motion vector having the opposite direction to the motion vector of the background frame, and, when there is the at least one object having the motion vector having the opposite direction to the motion vector of the background frame, determine one of the at least one object having the motion vector having the opposite direction to the motion vector of the background frame, as the reference object.

In an embodiment, the processor may detect a direction and a size of a motion vector of a background frame as the reference object is detected, and generate motion information for controlling driving of the external electronic device, based on the direction and the size of the motion vector of the background frame.

In an embodiment, the motion information may include a command to let a driver of the external electronic device ascend or descend.

In an embodiment, the external electronic device may be a simulation device that a user is able to ride in.

In an embodiment, the image may include a 360-degree image.

In an embodiment, the processor may correct a distortion of the detected reference region.

According to various embodiments of the disclosure, an electronic device may detect a content, detect a progressing direction of an image included in the content as the content is detected, detect a reference region including the detected progressing direction of the image, determine a reference object in the detected reference region, and generate motion information for controlling driving of the electronic device based on the determined reference object.

Figure 4:
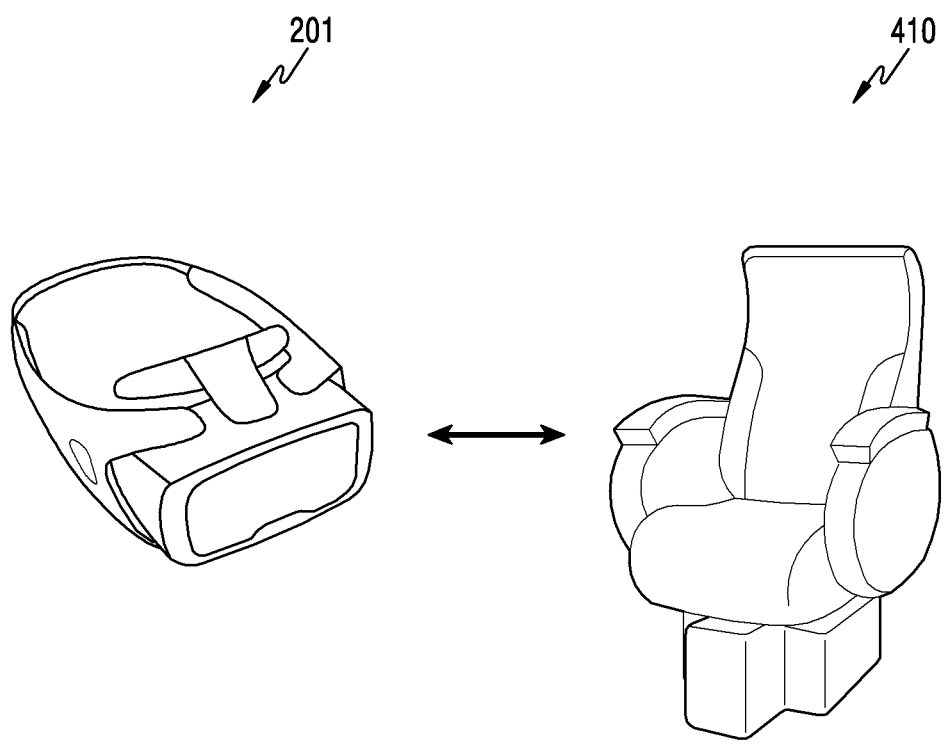
FIG. 4 is a concept view illustrating a method for generating and transmitting motion information according to various embodiments of the disclosure.

FIG. 4 is a concept view illustrating a method for generating and transmitting motion information according to various embodiments of the disclosure.

Referring to FIG. 4, an electronic device 201 and an external electronic device 410 are illustrated. The electronic device 201 may transmit and receive signals to and from the external electronic device 410, and may reproduce a content (for example, a virtual reality content) including a 3D image. The external electronic device 410 may provide a physical effect to a user according to a content provided from the electronic device 201. The physical effect refers to an effect that the user feels according to a motion of the external electronic device 410. For example, the external electronic device 410 may be a simulation device that the user can ride on, and may move forward and backward when a 30 roller coaster image of a movie scene is reproduced in a 4-dimension (4D) movie theater. However, the technical concept of the disclosure is not limited thereto. For convenience of explanation, the electronic device 210 will be described on the assumption that it is a head-mounted electronic device.

In an embodiment, the electronic device 201 may detect a content transmitted from the outside or stored therein. For example, the case in which the processor 210 detects the content may include a case in which the content is executed, a case in which the content is downloaded from the outside, a case in which the content is streamed from the outside, or a case in which a program for extracting motion information is executed. However, this should not be considered as limiting, and the case in which the processor 210 detects the content may include all cases in which an operation related to the content is executed. The content may include a multimedia copyright work such as an image, a video, a sound source, a game, or the like, a variety of information or contents transmitted and received in both directions through a network or the like, or information digitalized and produced, sold, and used through an information device. In addition, in an embodiment, the content may include a normal 3D image, a 360-degree image, a virtual reality content, or an augmented reality content. However, this should not be considered as limiting.

In addition, the content may include an image having a constant directionality. The constant directionality refers to a direction in which a dominant motion occurs in the corresponding image. For example, the content may include an image of the first person view in which a main character rides in a ride such as a car, a roller coaster, or the like, and moves. However, this should not be considered as limiting.

In addition, the content may include an image that is photographed by a 360-degree photographing device. The photographed image may have scenes having mobility, and for example, may be an image having a motion of a car photographed, and may have a region including directionality of the car. The region having the directionality of the car may be fixed to a specific portion of the 360-degree photographing device, or may be automatically determined in the photographing device or may be determined by user's selection. In the following description, a content including a 360-degree image will be described by way of an example.

In an embodiment, the electronic device 201 may reproduce the detected content and generate motion information in real time. That is, the electronic device 201 may extract motion information at the same as reproducing the content. Alternatively, the electronic device 201 may analyze a frame of an image included in the content, and may pre-generate motion information for each frame. However, the technical concept of the disclosure is not limited thereto. A detailed description will be provided below with reference to FIG. 5.

In an embodiment, the external electronic device 410 may include various devices. That is, the external electronic device 410 may be a simulation device that can provide a physical effect to a user. That is, the external electronic device 410 may be a mechanism that a user can ride in. For example, the external electronic device 410 described in the disclosure may be a chair-type simulator, a raider-type simulator, or an amusement park ride-type simulator, but is not limited thereto. For convenience of explanation, the external electronic device 410 will be described on the assumption that it is a chair-type simulation device.

In an embodiment, the electronic device 201 may transmit the generated motion information to the external electronic device 410 by using a communication module. The electronic device 201 may transmit the motion information to the external electronic device 410 in real time as the motion information is generated. Alternatively, the electronic device 201 may store the motion information in the corresponding content after generating the motion information, and may transmit content information including the motion information to the external electronic device 410.

The external electronic device 410 may receive the motion information from the electronic device 201, and may generate a motion of the external electronic device 410. The external electronic device 410 may receive the motion information and generate the motion in real time while the content is being reproduced. Operations between the external electronic device 410 and the electronic device 210 will be described in detail below with reference to FIGS. 13 to 17.

According to an embodiment of the disclosure, the electronic device 201 and the external electronic device 410 may be manufactured by being integrated into a single device, and the processor 210 may transmit generated motion information to a driver included therein. The integrated device will be described in detail below with reference to FIG. 18.

Figure 5:
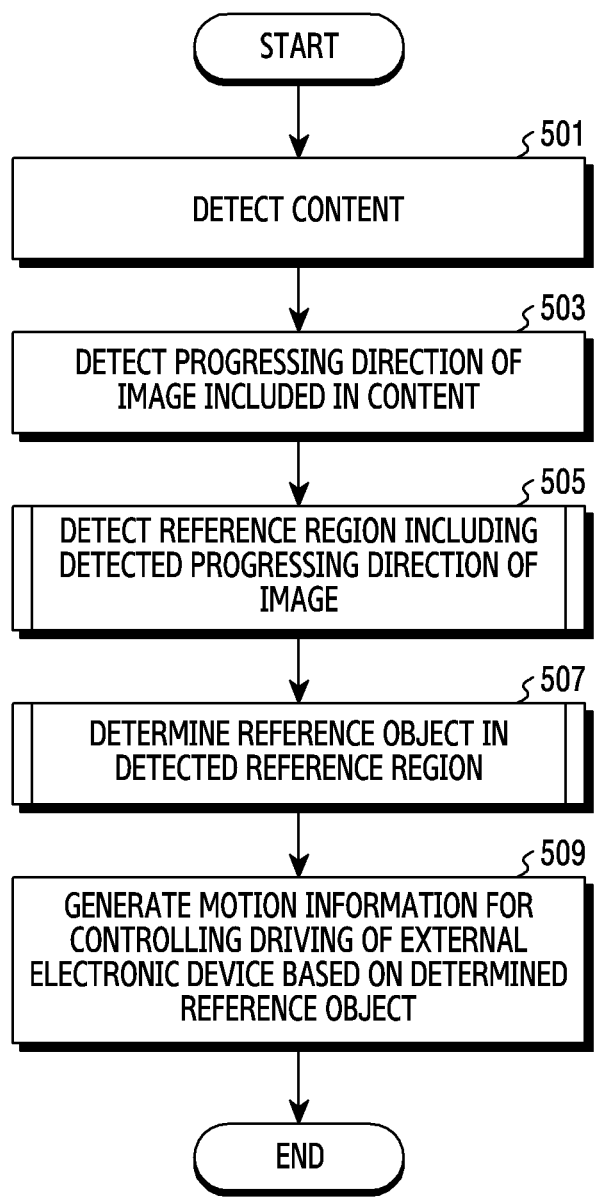
FIG. 5 is a flowchart illustrating a method for generating motion information according to an embodiment of the disclosure.

FIG. 5 is a flowchart illustrating a method for generating motion information according to an embodiment of the disclosure.

Referring to FIG. 5, in operation 501, the processor 210 in an embodiment may detect at least one content. The content may be a content that is transmitted from the outside or stored in the electronic device 201. For example, the case in which the processor 210 detects the content may include a case in which the content is executed, a case in which the content is downloaded from the outside, a case in which the content is streamed from the outside, or a case in which a program for extracting motion information is executed. However, this should not be considered as limiting, and the case in which the processor 210 detects the content may include all cases in which an operation related to the content is executed. The content may include a 3D image. The 3D image is a kind of a stereoscopic image, and may include a 360-degree image, a virtual reality image, an augmented reality image, or the like. However, this should not be considered as limiting.

A function of extracting motion information may be embedded in the processor 210 or may be implemented by using a separate program for extracting motion information. However, this should not be considered as limiting.

In an embodiment, the processor 210 may reproduce the detected content as the content is detected although this operation is not illustrated. The content may be reproduced according to a user input or the processor 210 may reproduce the content to extract motion information from the content. The processor 210 may extract motion information from the reproduced content in real time.

According to an embodiment of the disclosure, the processor 210 may extract motion information without reproducing the detected content. That is, the processor 210 may analyze each frame of the content and generate motion information before reproducing the content, and may insert the generated motion information into each frame. For example, the electronic device 201 may include a program for extracting motion information, and the processor 210 may generate motion information from the content by executing the motion information program. However, the technical concept of the disclosure is not limited thereto.

According to an embodiment of the disclosure, the processor 210 may detect the content as the program for extracting motion information is executed. For example, when the program for extracting the motion information is executed, the processor 210 may detect the content by using the program for extracting the motion information, and may generate motion information of the detected content.

In operation 503, the processor 210 in an embodiment may detect a progressing direction of an image included in the content as the content is detected. That is, the processor 210 may extract the motion information from the content at the same time as detecting the content. The progressing direction of the image may be a progressing direction of a region including a plurality of difference motion vectors which are symmetrical to each other. For example, when an image is photographed from the viewpoint of a driver driving a car, the progressing direction of the image may be a moving direction of the car. A plurality of difference motion vectors which are symmetrical to each other in a region including the moving direction of the car may be detected. In addition, the progressing direction of the image may be a moving direction of a main character in the image of the first person view. In addition, the progressing direction of the image may be a moving direction of a mechanism that the main character of the image rides in. However, the technical concept of the disclosure is not limited thereto. However, the technical concept of the disclosure is not limited thereto.

For convenience of explanation in the following description, an image of the first person view in which a main character riding in a car is traveling will be described by way of an example. However, this should not be considered as limiting, and various images such as riding on a ride, boarding an airplane, or the like may be applied.

In an embodiment, the content may include an image that is photographed by a 360-degree content recorder. For example, the photographed 360-degree image may be a car traveling image of the first person view. That is, the content may be an image which is photographed from the viewpoint of a driver driving a car. When the traveling of the car is photographed as a 360-degree image of the first person view, a direction seen through the windshield of the car may be detected as the progressing direction of the corresponding image. A specific method for detecting the progressing direction of an image will be described below with reference to FIGS. 6 to 8.

In operation 505, the processor 210 in an embodiment may detect a reference region including the progressing direction of the detected image. The reference region may be some region of an N frame at the time when the progressing direction of the image is detected. The reference region may include a direction in which the image progresses in the N frame. The reference region may be a region with reference to which the motion information of the image is extracted. However, the technical concept of the disclosure is not limited thereto. A specific method for detecting the reference region will be described with reference to FIGS. 6 to 8.

In operation 507, the processor 210 in an embodiment may determine a reference object in the detected reference region. The reference object may be an object that has a motion in the opposite direction to the progressing direction of the image. The reference object may be a fixed object rather than an object having an independent motion in the image. That is, the reference object may be a fixed object in the image, such as a tree, a street lamp, or the like. Accordingly, the reference object may be an object that has a relative motion in the image according to the motion of the main character riding in the car. However, this should not be considered as limiting. A specific method for determining the reference object will be described below with reference to FIGS. 10 to 12.

In operation 509, the processor 210 in an embodiment may generate motion information for controlling the operation of the external electronic device 410, based on the determined reference object. The external electronic device 410 may be a simulation device as explained above, and may be operated and moved according to the motion information. The motion information may include pieces of motion information of objects related to the progressing direction of the image. For example, the motion information may include information related to the motion of the car in which the main character rides. In addition, the motion information may include control information for operating the motion of the simulation device according to the motion of the objects related to the forwarding direction of the image. In addition, the motion information may further include identification information, function information, state information, information regarding a preferred communication method, communication connection information, or the like. However, this should not be considered as limiting. A specific method for generating the motion information will be described below with reference to FIGS. 13 to 17.

As described above, the processor 210 may detect the progressing direction of the image, generate the motion information in the reference region including the progressing direction of the image, and operate the external electronic device based on the generated motion information.

The reason why the motion information is generated based on the reference region is that the reference region reflects a situation that the main character currently experiences. For example, when the main character rides in the car and drives the car, a motion that the main character will experience may be identified in the reference region including the progressing direction of the image, and the user who rides on the simulation device should have an effect of indirectly having the same experience of the main character through the simulation device while viewing the image.

The processor 210 may transmit the motion information to the external electronic device 410 after generating the motion information although this operation is not illustrated. The processor 210 may transmit the generated motion information to the external electronic device 410 in real time. In an embodiment, the processor 210 may store the generated motion information in each frame and then may transmit the motion information to the external electronic device 410. However, this should not be considered as limiting. The operation of the electronic device 210 generating the motion information, and the operating method of the external electronic device 410 will be described below with reference to FIGS. 13 to 17.

According to an embodiment of the disclosure, the electronic device 201 and the external electronic device 410 may be manufactured by being integrated into a single device, and the processor 210 may transmit the generated motion information to a driver included therein. The integrated device will be described in detail below with reference to FIG. 18.

The method may not directly finish after operation 509, and the processor 210 may continue generating motion information in real time while reproducing the content at the same as transmitting the generated motion information to the external electronic device 410.

Figure 6:
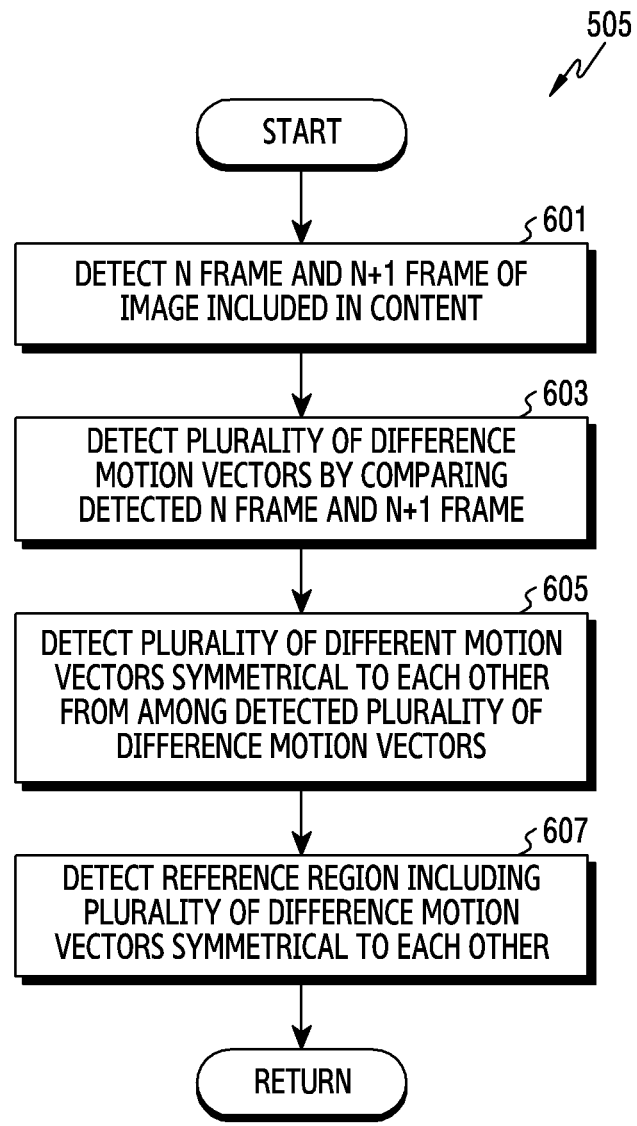
FIG. 6 is a flowchart illustrating a method for detecting a reference region according to an embodiment of the disclosure.

FIG. 6 is a flowchart illustrating a method for detecting a reference region according to an embodiment of the disclosure. FIG. 6 is a flowchart illustrating operation 505 of FIG. 5 in detail.

Figure 7:
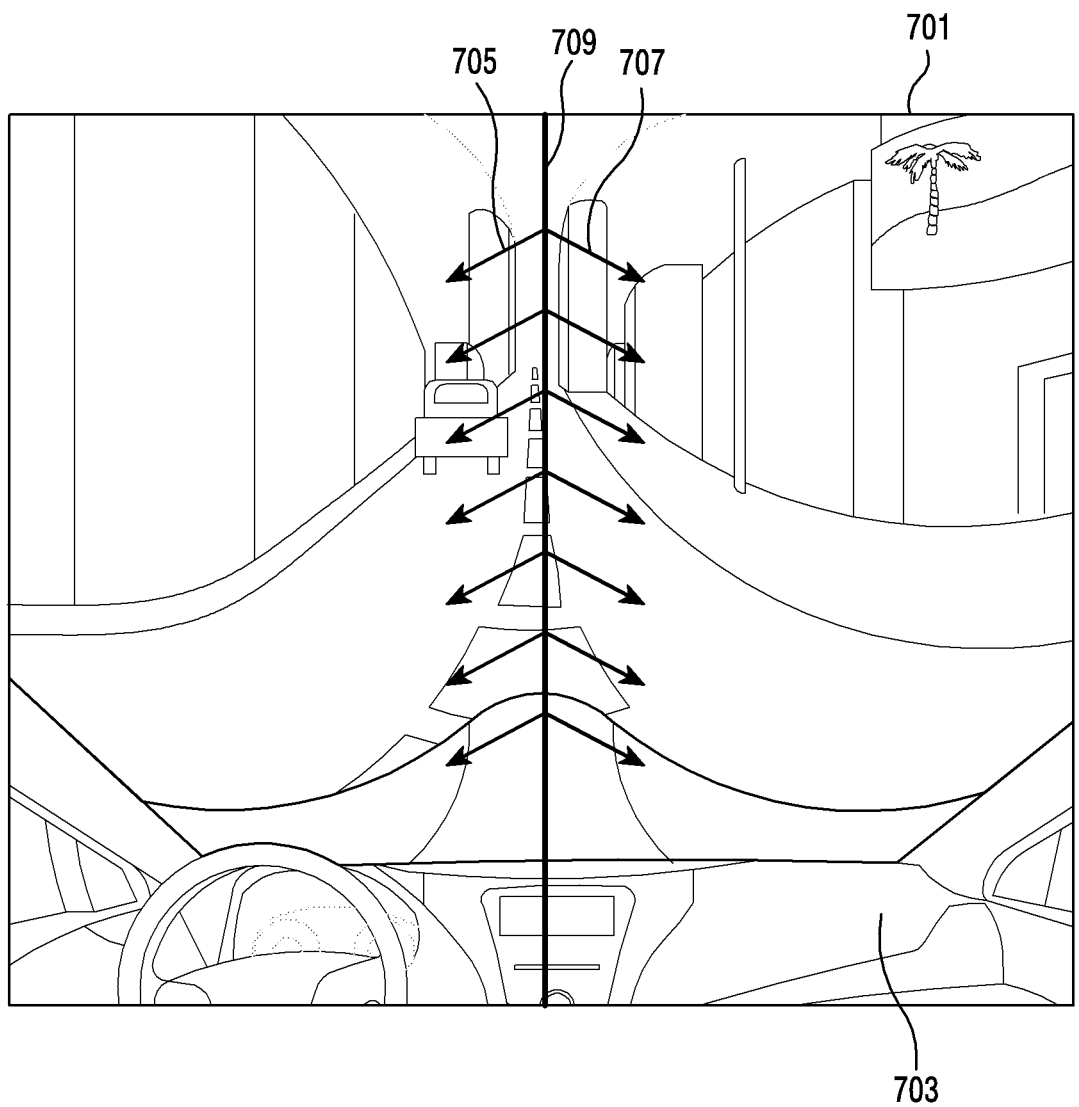
FIGS. 7 and 8 are example views illustrating a method for detecting a reference region according to an embodiment of the disclosure.
Figure 8:
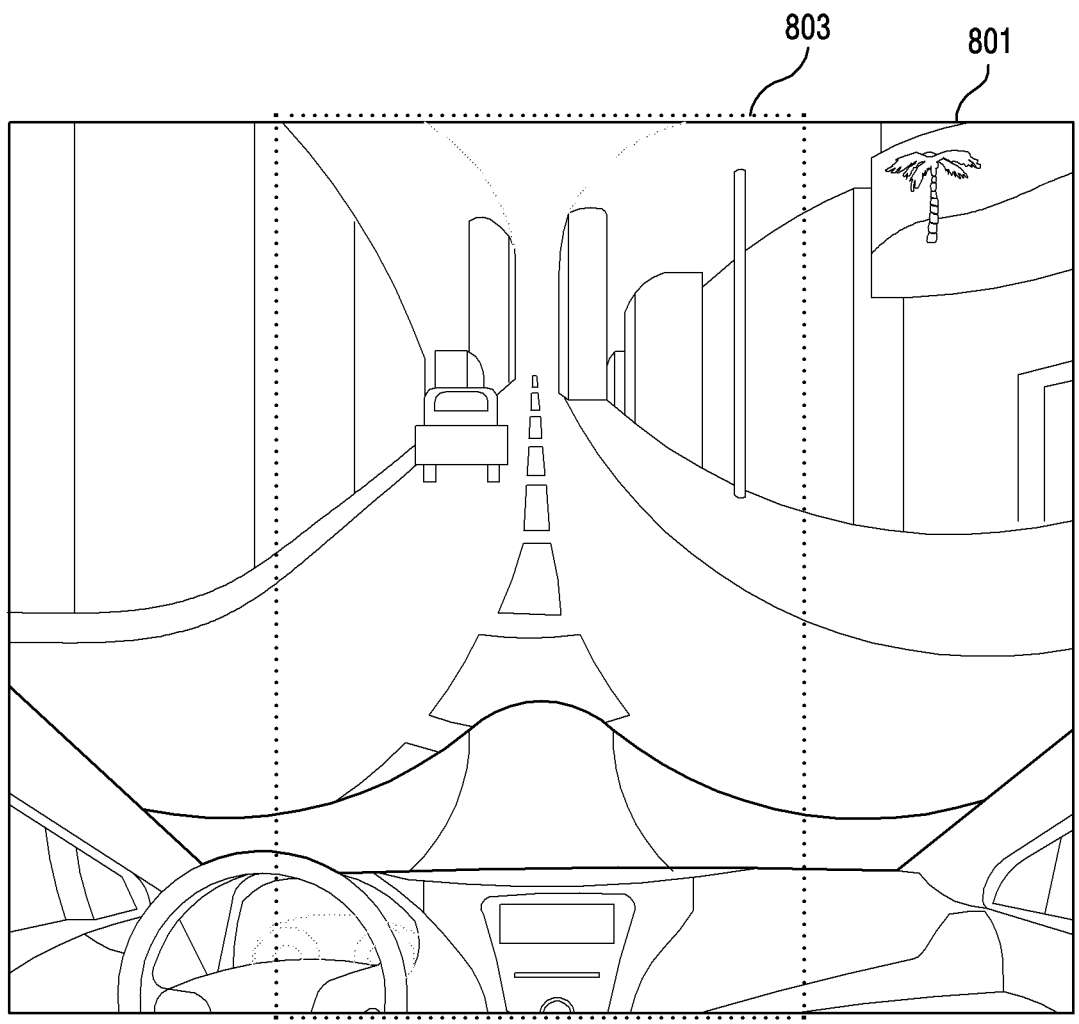

FIGS. 7 and 8 are example views illustrating the method for detecting the reference region according to an embodiment of the disclosure.

Referring to FIG. 6, in operation 601, the processor 210 in an embodiment may detect an N frame and an N+1 frame of the image included in the content. The image may be formed of a plurality of continuous image frames, and the N frame of the plurality of image frames may be the present frame, and the N+1 frame may be the next frame continuing from the N frame in time. In addition, the N+1 frame may be the present frame, and the N frame may be the previous frame continuing to the N+1 frame in time.

In an embodiment, the processor 210 may generate motion information in real time in every frame of the image while reproducing the content. Accordingly, the processor 210 may grasp a progressing direction of the image in each frame to generate motion information in real time, and simultaneously, may generate motion information related to the progressing direction, and may store the generated motion information in each frame. In the following description, it will be illustrated that the N frame is the present frame and the N+1 frame is the next frame of the N frame for convenience of explanation. However, this should not be considered as limiting.

In operation 603, the processor 210 in an embodiment may detect a plurality of difference motion vectors by comparing the N frame and the N+1 frame detected. The difference motion vector is a vector indicating a difference value between a motion vector of the N+1 frame and a motion vector of the N frame. Specifically, a motion of each object is detected from the N frame and a motion vector is detected according to the motion of each object. For example, as the car in which the main character rides moves, a relative motion of a background, relative motions of trees and a street lamp seen through the windshield of the car, or motions of other cars may be detected, and a motion vector may be calculated according to each of the motions. In the N+1 frame, respective motion vectors may be calculated according to the motions in the same way as in the N frame. In an embodiment, the processor 210 may detect a difference motion vector between the motion vectors detected from the same region of the N frame and the N+1 frame. That is, the processor 210 may detect a difference motion vector in each region of the image by calculating a difference between the motion vector of the N frame and the motion vector of the N+1 frame in the same region.

The motion information which is generated by analyzing the N frame and the N+1 frame may include a motion occurring between the N frame and the N+1 frame, but in reality, the motion information may be generated after the N+1 frame. Accordingly, the motion information, which is generated by analyzing the N frame and the N+1 frame, may be set to be operated between the N frame and the N+1 frame to synchronize between the motion information and the image when the real image is reproduced. Accordingly, the external electronic device 410 may be operated according to the motion information generated based on the N frame and the N+1 frame when the N frame and the N+1 frame are reproduced. However, this should not be considered as limiting.

In operation 605, the processor 210 in an embodiment may detect a plurality of difference motion vectors which are symmetrical to each other from among the detected plurality of difference motion vectors. In the region including the progressing direction of the image, the plurality of difference motion vectors may be symmetrical to each other. For example, when the main character drives the car straightly, the progressing direction of the image may be a front surface of the windshield of the car, and the motions on the left and the right may be symmetrical to each other when seen by the main character through the the front surface of the windshield.

Referring to FIG. 7, in an embodiment, when a car 703 moves in an image 701, a plurality of difference motion vectors 705, 707 may be detected. As shown in FIG. 7, the main character may move forward while driving the car, and, when the main character rides in the car and goes forward, a left background and a right background may be symmetrical to each other with reference to a center axis 709 of the front surface, and may relatively move. That is, the left background may have a first difference motion vector 705, and the right background may have a second difference motion vector 707. The left background and the right background may have relative motions according to the motion of the car, and accordingly, may have the first difference motion vector 705 and the second difference motion vector 707, respectively, as shown in FIG. 7. When the background has the first difference motion vector 705 and the second difference motion vector 707, the progressing direction of the image may be determined to the direction of the center axis 709. However, this should not be considered as limiting.

In operation 607, the processor 210 in an embodiment may detect a reference region including the plurality of difference motion vectors 705, 707 symmetrical to each other. Referring to FIG. 8, a reference region 803 including the progressing direction of the car may be detected in an image 801. That is, the region in which the plurality of difference motion vectors 705, 707 symmetrical to each other are detected may include the progressing direction of the main character riding in the car. Accordingly, the detected region should be a reference region to analyze information regarding the progressing direction of the image. However, this should not be considered as limiting, and there may be various methods for detecting the reference region.

The processor 210 may perform the operation of operation 507 of FIG. 5 after operation 607 (return). However, this should not be considered as limiting.

Figure 9:
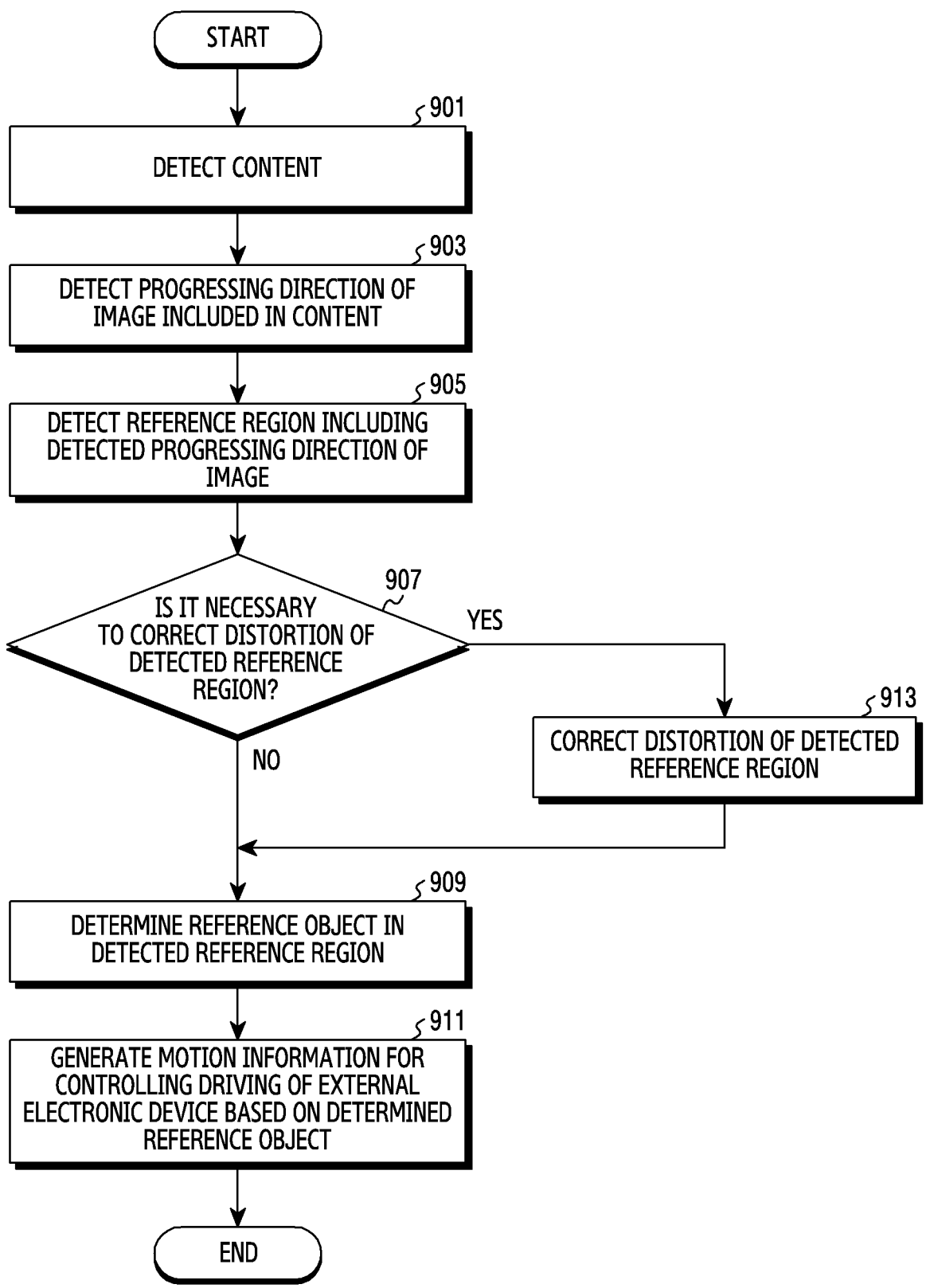
FIG. 9 is a flowchart illustrating a method for correcting a distortion of a reference region according to another embodiment of the disclosure.

FIG. 9 is a flowchart illustrating a method for correcting a distortion of a reference region according to another embodiment of the disclosure.

Referring to FIG. 9, in operation 907, the processor 210 in an embodiment may determine whether it is necessary to correct a distortion of the detected reference region after the reference region is detected. As described above, the content may include a 360-degree image. The 360-degree image may be generally photographed by a fisheye lens. The fisheye lens is a super wide angle lens having an angle of field exceeding 180 degrees. Accordingly, an image photographed by the fisheye lens may have a distortion in comparison to a real image. Accordingly, when the reference region is detected and analyzed, the motions of objects may be easily detected by correcting the distortion by making inverse distortion. Accordingly, when it is necessary to correct the distortion in the detected reference region, the processor 210 may correct the distortion of the reference region.

When it is determined that it is necessary to correct the distortion of the detected reference region, the processor 210 may correct the distortion of the reference region to make inverse distortion in operation 913. Of course, the electronic device 210 may extract the motion information without correcting the distortion of the reference region. However, this should not be considered as limiting.

When it is determined that it is not necessary to correct the distortion of the detected reference region, the processor 210 may determine a reference object in the detected reference region in operation 909, and may execute operation 911.

After detecting a corrected reference region after operation 913, the processor may determine a reference object in the corrected reference region, and may generate motion information based on the determined reference object. Operations 901, 903, 905, 909, and 911 are the same as operations 501, 503, 505, 507, and 509, respectively, and thus a detailed description thereof is omitted.

The method may not directly finish after operation 911, and the processor 210 may continue generating motion information in real time while reproducing the content at the same time as transmitting the motion information to the external electronic device 410.

Figure 10:
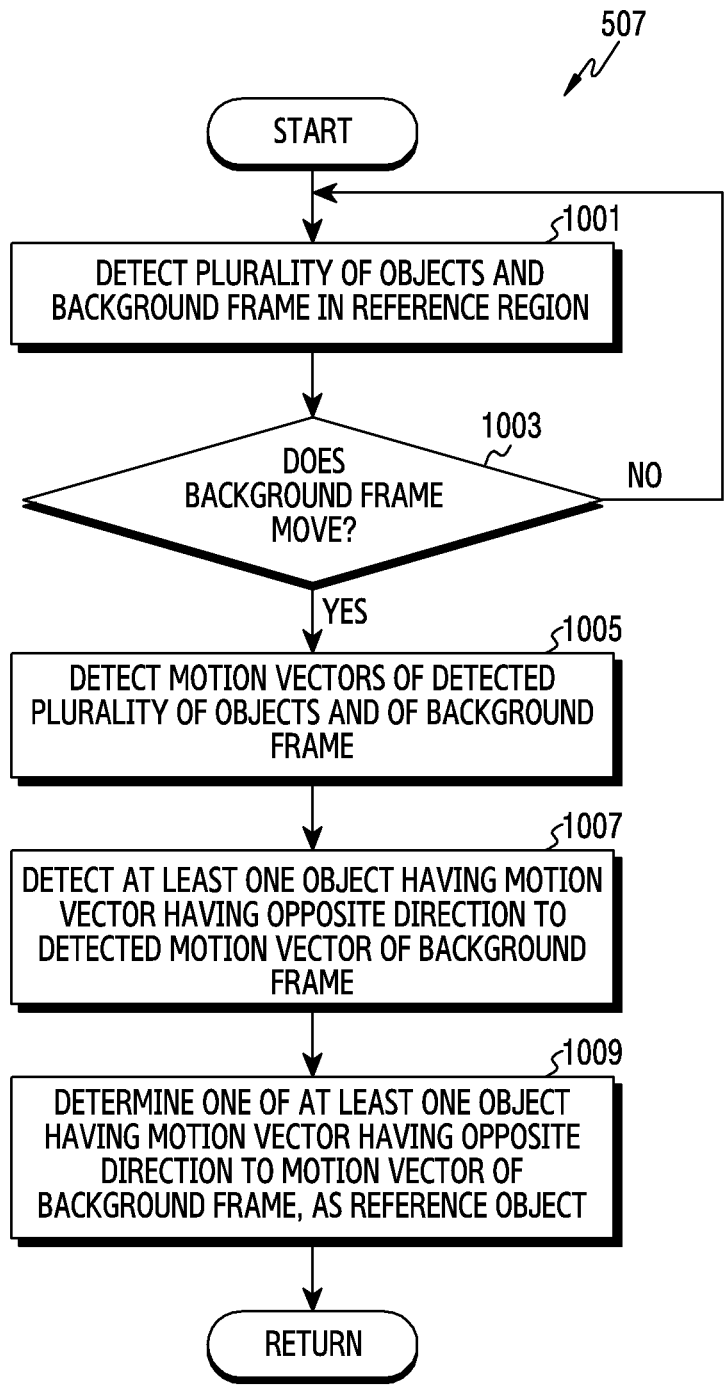
FIG. 10 is a flowchart illustrating a method for determining a reference object according to an embodiment of the disclosure.

FIG. 10 is a flowchart illustrating a method for determining a reference object according to an embodiment of the disclosure. FIG. 10 is a flowchart illustrating operation 507 of FIG. 5 in detail.

Figure 11:
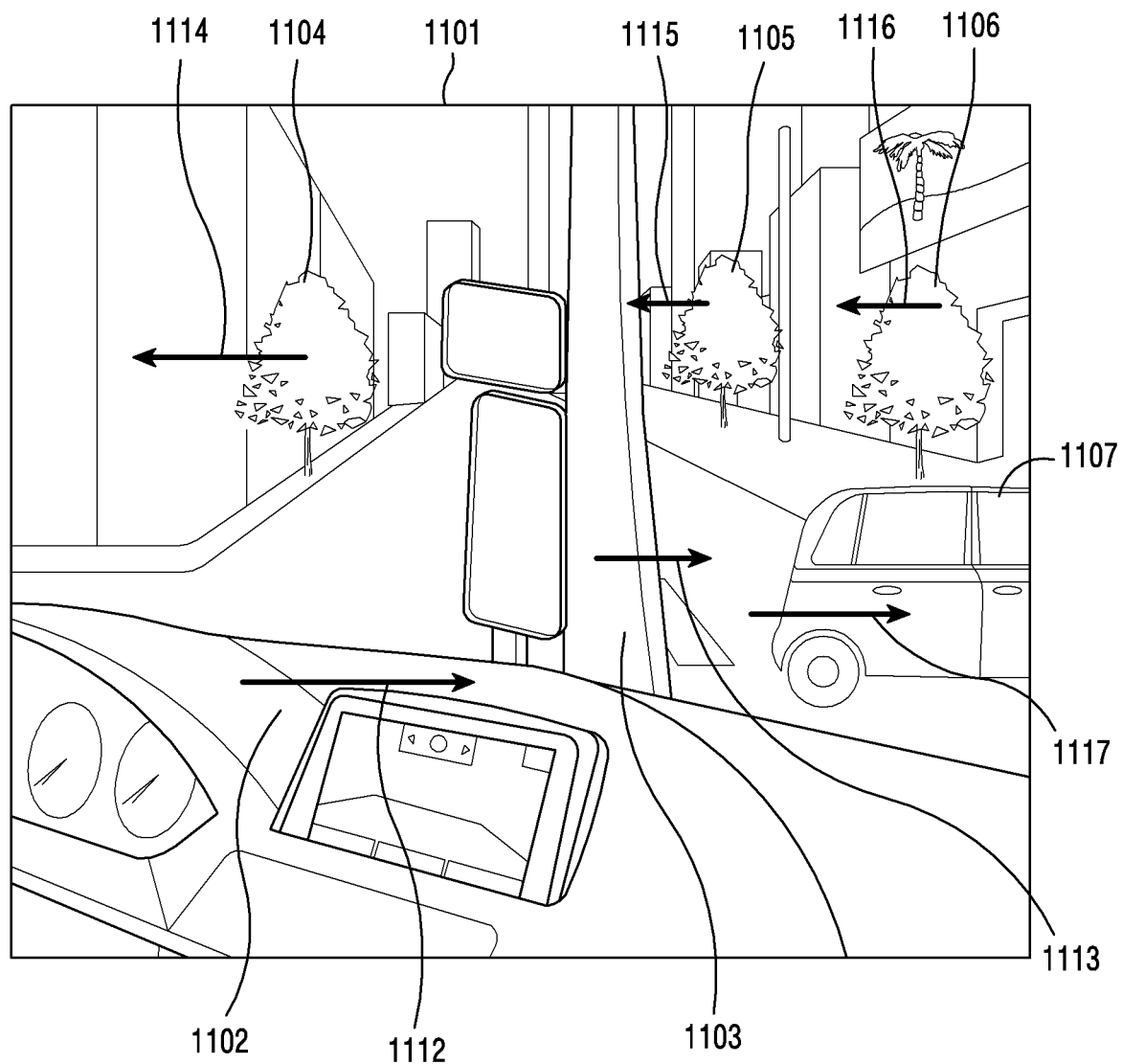
FIG. 11 is an example view illustrating a method for determining a reference object according to an embodiment of the disclosure.

FIG. 11 is an example view illustrating a method for determining a reference object according to an embodiment of the disclosure.

Referring to FIGS. 10 and 11, in operation 1001, the processor 210 in an embodiment may detect a plurality of objects and a background frame in a reference region 1101. Referring to FIG. 11, when the main character turns right in the image, the processor 210 may detect a car dashboard 1102, a background frame 1103, an external car 1107, a first tree 1104, a second tree 1105, and a third tree 1106, etc. in the reference region 1101. However, this should not be considered as limiting, and all of the plurality of objects included in the image may be detected.

In an embodiment, the background frame 1103 may be an index indicating the progressing direction of the image. For example, the background frame 1103 may be any one of a frame of the car, a window, a dashboard mounted in the car, or an outline of the reference region when the main character drives the car. However, this should not be considered as limiting, and the background frame 1103 may be an object having the same moving direction as the moving direction of the main character. When the frame of the car, the window, or the dashboard mounted in the car is defined as the background frame 1103, the background frame 1103 may be an object indicating the moving direction of the car in which the main character rides. The moving direction of the background frame may be a direction in which the background frame 1103 is changed, and the direction in which the background frame 1103 is changed in real time may be the same as the moving direction of the car in which the main character rides. That is, the background frame 1103 may be an index indicating the progressing direction of the image. When an object (for example, the frame of the car) the direction of which matches the moving direction of the main character is not displayed in the reference region 1101, the outline of the reference region 1101 may be set as the background frame 1103. The outline of the reference region 1101 may refer to a boundary of the angle of view of the image photographing device, or a boundary of the field of view of the main character of the image. That is, frames seen from the outline of the reference region 1101 may be utilized as an index indicating the moving direction of the main character. Of course, even when some part of the car the direction of which matches the moving direction of the main character is displayed in the reference region 1101, the outline of the reference region 1101 may be selected as the background frame 1103. However, this should not be considered as limiting.

In an embodiment, the plurality of objects may include an object belonging to the car of the main character like the car dashboard 1102, an object moving independently from the car of the main character like the external car 1107, or an object having the relative opposite motion to the car of the main character according to the motion of the car of the main character, like the first to third trees 1104, 1105, 1106. In an embodiment, the reference object may be an index for identifying the motion of the car in which the main character rides, along with the background frame. That is, when the motion of the background frame and the motion of the reference object are opposite to each other, the motion of the background frame may be determined as the motion of the car. Accordingly, the object belonging to the car like the car dashboard 1102, or the object independent from the car like the external car 1107 cannot be determined as the reference object, and objects having the relative opposite motions to the car of the main character according to the motion of the car of the main character, like the first to third trees 1104, 1105, 1106, may be the reference object. As described above, the candidate objects to be the reference object may be fixed objects without constant motions like a tree in the image. However, this should not be considered as limiting.

In an embodiment, the processor 210 may determine some of the detected plurality of objects as a reference object candidate group. That is, the processor 210 may determine the first to third trees 1104, 1105, 1106 having a high probability of being determined as the reference object, as the reference object candidate group. A condition for determining the reference object candidate group may be determined by considering all of a size occupying the image, a position of an object disposed in the image, and a direction and size of a motion vector. The operation of determining the object candidate group may be omitted or may be executed after motion vectors are detected (operation 1005).

In operation 1003, the processor 210 in an embodiment may determine whether the background frame 1103 is moving. That is, the processor 210 may detect whether the background frame 1103 is moving by comparing the N frame and the N+1 frame. Operation 1003 of determining the motion of the background frame 1103 may be omitted, and operation 1005 may be directly executed. An embodiment related thereto will be described in FIG. 17.

In operation 1005, the processor 210 in an embodiment may detect motion vectors of the detected plurality of objects and of the background frame 1103. The processor 210 may detect the motion vectors of the objects by comparing the N frame and the N+1 frame. For example, the processor 210 may detect a motion vector 1112 of the car dashboard 1102, a motion vector 1113 of the background frame 1103, a motion vector 1114 of the first tree 1104, a motion vector 1115 of the second tree 1105, a motion vector 1116 of the third tree 1106, a motion vector 1117 of the external car 1107, or the like.

In operation 1007, the processor 210 in an embodiment may detect at least one object having a motion vector having the opposite direction to the motion vector 1113 of the background frame 1103. The processor 210 may identify the direction of the motion vector 1113 of the background frame 1103, first, and may detect a plurality of objects including motion vectors having the opposite direction to the direction of the motion vector 1113 of the background frame 1103. In FIG. 11, the at least one object having the motion vectors having the opposite direction to the direction of the motion vector 1113 of the background frame 1103 may be the first to third trees 1104, 1105, 1106.

In operation 1009, the processor 210 in an embodiment may determine one reference object from among the at least one object having the motion vector having the opposite direction to the motion vector 1113 of the background frame 1103. For example, when the background 1103 moves to the right as the car turns right, the first tree 1104 relatively moving to the left may be determined as the reference object. However, this should not be considered as limiting, and the second tree 1105 or the third tree 1106 may be determined as the reference object.

In addition, according to an embodiment of the disclosure, when the first to third trees 1104, 1105, 1106 move in similar directions, the processor 210 may detect an object distanced away from the progressing direction of the background frame 1103, first. That is, for example, when the car currently turns right, the first tree 1104 which will disappear first in the image may be determined as the reference object, first.

In addition, according to an embodiment of the disclosure, when the detected objects move in similar directions, the reference object may be determined by considering the size of each vector. For example, an object that shows the most abrupt motion from among the objects having the motions in the opposite direction to the background frame 1103 may be determined as the reference object. However, this should not be considered as limiting, and the reference object may be determined from among the objects having the motions in the opposite direction to the background frame 1103 in various ways.

According to another embodiment of the disclosure, the reference object may be determined from among the plurality of objects before it is determined whether the background frame 1103 is moved, although this operation is not illustrated. That is, an object that has a high probability of being determined as the reference object may be determined as the reference object first, and is compared with the motion vector 1113 of the background frame 1103. When the pre-determined reference object has a motion vector in the opposite direction to the motion vector 1113 of the background frame 1103, the object may be confirmed as the reference object.

According to an embodiment of the disclosure, the reference object may be replaced in each of the plurality of continuous frames of the image. When the main character rides in the car and moves in the image, a scene viewed through the field of view of the main character continuously changes with time. Accordingly, to extract motion information of the image, motion information of the car should be generated in each frame. Accordingly, the reference object should be determined in each frame. For example, when the first tree 1104 is determined as the reference object, the first tree 1104 may disappear from the image in the next frame according to the movement of the car. In this case, the reference object may be changed to the second tree 1105, which is included in the next reference object candidate group, in real time. In addition, the third tree 1106 may be determined as the next reference object according to the continuous motion of the car. In an embodiment, to determine the reference object in every frame in real time, the processor 210 may determine the reference object candidate group in every frame, and may determine one of them as the reference object and replace the reference object in the next frame.

In an embodiment, the processor 210 may generate motion information by considering the motion vector of the background frame 1103 as the reference object 1104 is detected. For example, since the background frame 1104 turns right, motion information indicating that the car in which the main character currently rides turns right may be generated. A detailed description will be provided with reference to FIGS. 15 and 16.

The generated motion information may include a motion occurring between the N frame and the N+1 frame, but may be really generated after the N+1 frame. Accordingly, the motion information which is generated by analyzing the N frame and the N+1 frame may be set to be operated between the N frame and the N+1 frame to synchronize between the motion information and the image while the real image is being reproduced. Accordingly, the external electronic device 410 may be operated according to the motion information generated based on the N frame and the N+1 frame when the N frame and the N+1 frame are reproduced. However, this should not be considered as limiting.

After operation 1009, operation 509 of FIG. 5 may be executed (return). However, this should not be considered as limiting.

Figure 12:
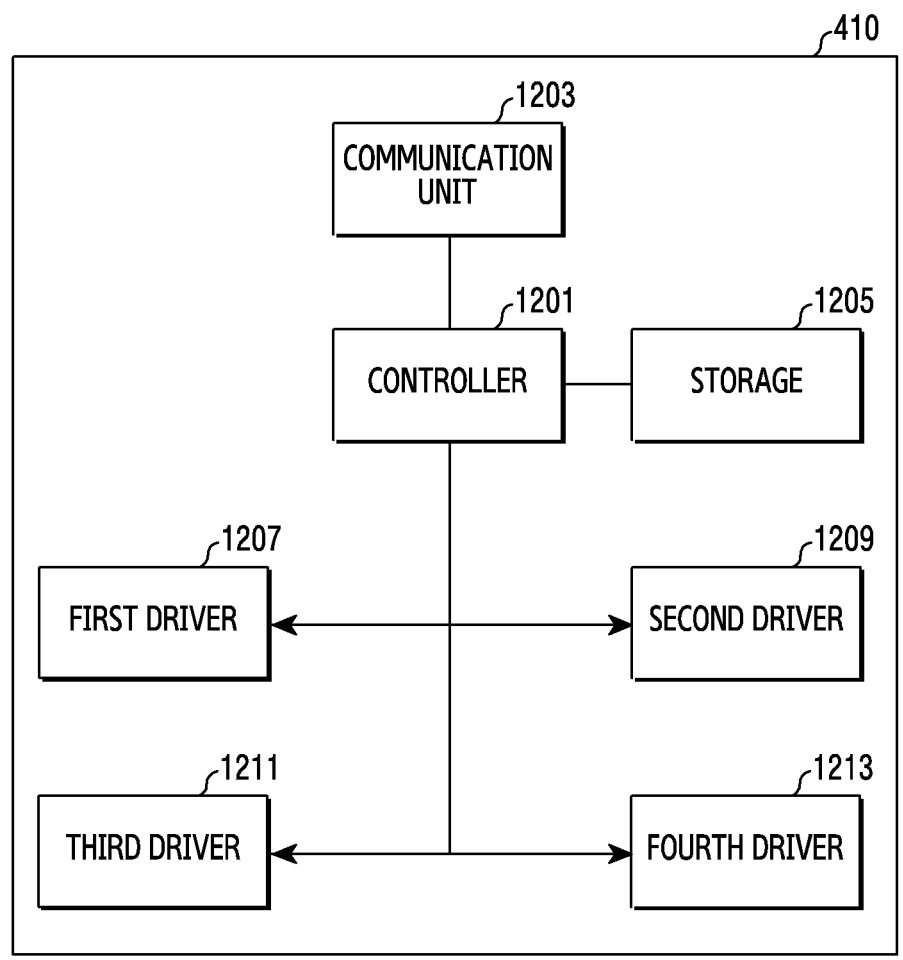
FIG. 12 is a block diagram of an external electronic device according to various embodiments of the disclosure.

FIG. 12 is a block diagram of the external electronic device according to various embodiments of the disclosure.

The external electronic device 410 will be described before the method for generating motion information by using the reference object is described. Since the motion information is information for operating the external electronic device 410, the operation of generating the motion information is described with the electronic device 201 and the external electronic device 410.

Referring to FIG. 12, the external electronic device 410 includes a controller 1201, a communication unit 1203, a storage 1205, and first to fourth drivers 1207, 1209, 1211, 1213.

The controller 1201 may interpret motion information received from the communication unit 1202, and may transmit a driving control signal to the first to fourth drivers 1207, 1209, 1211, 1213. The controller 1021 may drive, for example, an operating system or an application program, to control a plurality of hardware or software elements connected to the controller 1201, and may perform various data processing and calculation. The controller 1201 may be implemented by using a system on chip (SoC), for example. The controller 1201 may control motions of the first to fourth drivers 1207, 1209, 1211, 1213.

The communication unit 1203 may receive the motion information from the electronic device 201. The communication unit 1203 may transmit and receive, for example, communication signals (for example, RF signals). The communication unit 1203 may include, for example, a transceiver, a power amp module (PAM), a frequency filter, a low noise amplifier (LNA), or an antenna. According to another embodiment, the communication unit may further include at least one of a cellular module, a WiFi module, a Bluetooth module, a low power Bluetooth module, a GNSS module, or an NFC module although they are not illustrated, and each module may transmit and receive RF signals through a separate RF module. A subscriber identification module may include, for example, a card or an embedded SIM including a subscriber identification module, and may include unique identification information (for example, an integrated circuit card identifier (ICCID)), or subscriber information (for example, an international mobile subscriber identity (IMSI)).

The storage 1205 may store the motion information received from the electronic device 201, and may invoke the motion information when there is a request for reproduction from a user. The storage 1205 (for example, a memory) may include, for example, an internal memory or an external memory. The internal memory may include at least one of a volatile memory (for example, a DRAM, an SRAM, or an SDRAM), and a nonvolatile memory (for example, a one time programmable ROM (OTPROM), a PROM, an EPROM, an EEPROM, a mask ROM, a flash ROM, a flash memory, a hard drive, or a solid state drive (SSD)). The external memory may include a flash drive, for example, a compact flash (CF), a secure digital (SD), a micro-SD, a mini-SD, extreme digital (xD), a multi-media card (MMC), or a memory stick. The external memory may be functionally or physically connected with the electronic device 201 through various interfaces.

The first to fourth drivers 1207, 1209, 1211, 1213 generate physical motions of the external electronic device 410 according to the motion information. The first to fourth drivers 1207, 1209, 1211, 1213 may generate vertical and horizontal motions of the external electronic device 410, and may further include a transverse axis movement unit to generate a transverse movement and inertia although it is not illustrated. The first to fourth drivers 1207, 1209, 1211, 1213 may be driven in a hydraulic or pneumatic method, and may generate motions by driving a gear using a motor. For example, the first to fourth drivers 1207, 1209, 1211, 1213 may be arranged at four corners of the bottom surface of the external electronic device 410. However, the number and positions of the drivers are not limited thereto.

The external electronic device 410 may further include a sensor unit to detect riding by a user although it is not illustrated in the drawing.

According to an embodiment of the disclosure, the electronic device 201 and the external electronic device 410 may be manufactured by being integrated into a single device, and the processor 210 may transmit the generated motion information to a driver included therein. The integrated device will be described in detail below with reference to FIG. 18.

Figure 13:
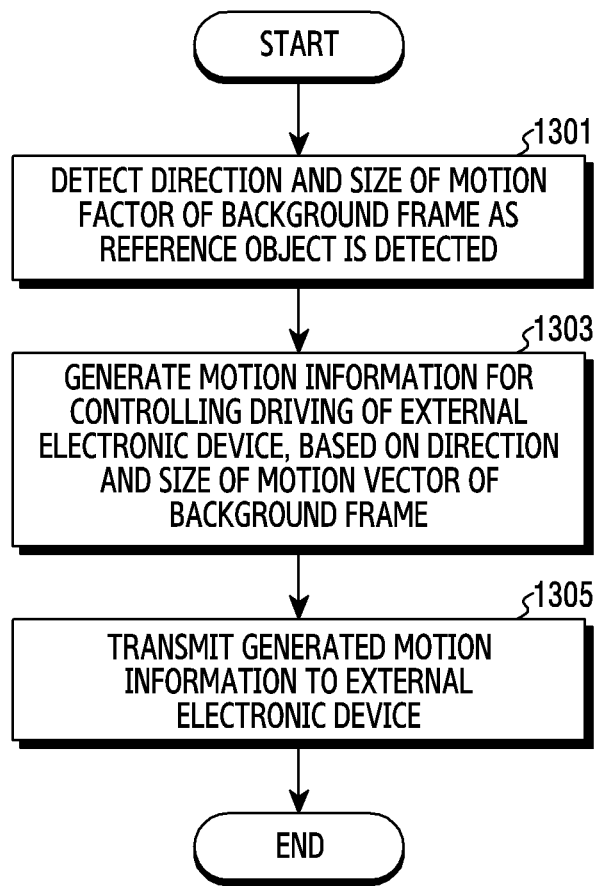
FIG. 13 is a flowchart illustrating a method for generating motion information according to an embodiment of the disclosure.

FIG. 13 is a flowchart illustrating a method for generating motion information according to an embodiment of the disclosure.

Referring to FIG. 13, in operation 1301 in an embodiment, when it is determined that a background frame moves, and a reference object is determined, the processor 210 may generate motion information of the external electronic device 410 according to a motion of the background frame. Specifically, the processor 210 may detect a direction and a size of a motion vector of the background frame as a reference object is detected. For example, when an object having a motion vector having the opposite direction to the motion vector of the background frame is detected as a reference object from a reference object candidate group, the processor 210 may determine that the car of a main character is currently moving in the motion vector direction of the background frame, and may generate motion information in the motion vector direction of the background frame. Accordingly, the processor 210 may detect the direction and size of the motion vector of the background frame to generate the motion information.

According to another embodiment of the disclosure, the processor 210 identify the direction and size of the motion vector of the already detected background frame as the reference object is determined. That is, since the motion vector of the background frame is detected in operation 1005 as described in FIG. 10, the detected motion vector of the background frame may be identified again, and may be utilized to generate motion information.

In operation 1303, the processor 210 in an embodiment may generate motion information for controlling driving of the external electronic device 410, based on the direction and size of the motion vector of the background frame. For example, a direction in which the external electronic device will move may be set according to the direction of the motion vector of the background frame, and moving strength of the external electronic device may be set according to the size of the motion vector of the background frame. In an embodiment, the generated motion information may be stored in header information of the content or may be stored in a separate memory as motion information.

In operation 1305, the processor 210 in an embodiment may transmit the generated motion information to the external electronic device 410. For example, the processor 210 may transmit the motion information to the communication unit 1203 of the external electronic device 410 by using the RF module 229.

The method may not directly finish after operation 1305, and the processor 210 may generate motion information in real time while reproducing the content. However, this should not be considered as limiting.

Figure 14:
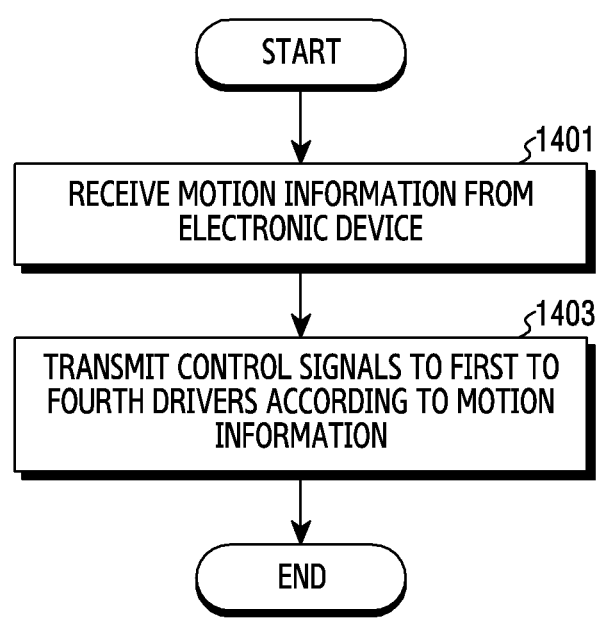
FIG. 14 is a flowchart illustrating a method for operating an external electronic device according to motion information according to an embodiment of the disclosure.

FIG. 14 is a flowchart illustrating a method for driving the external electronic device according to motion information according to an embodiment of the disclosure.

Referring to FIG. 14, in operation 1401, the external electronic device 410 in an embodiment may receive motion information from the electronic device 201. For example, the external electronic device 410 may receive the motion information from the electronic device 201 through the communication unit 1203 after power is turned on or riding by a user is detected.

In operation 1403, the external electronic device 410 in an embodiment may transmit a control signal to the first to fourth drivers 1207, 1209, 1211, 1213 according to the motion information received from the electronic device 201. The operation of the electronic device 201 generating a motion and the operation of the external electronic device 410 driving a motion will be described in detail with reference to FIGS. 15 and 16.

The method may not directly finish after operation 1403, and the external electronic device 410 may generate a motion effect at the same time as receiving the motion information from the electronic device 201 in real time. However, this should not be considered as limiting.

Figure 15:
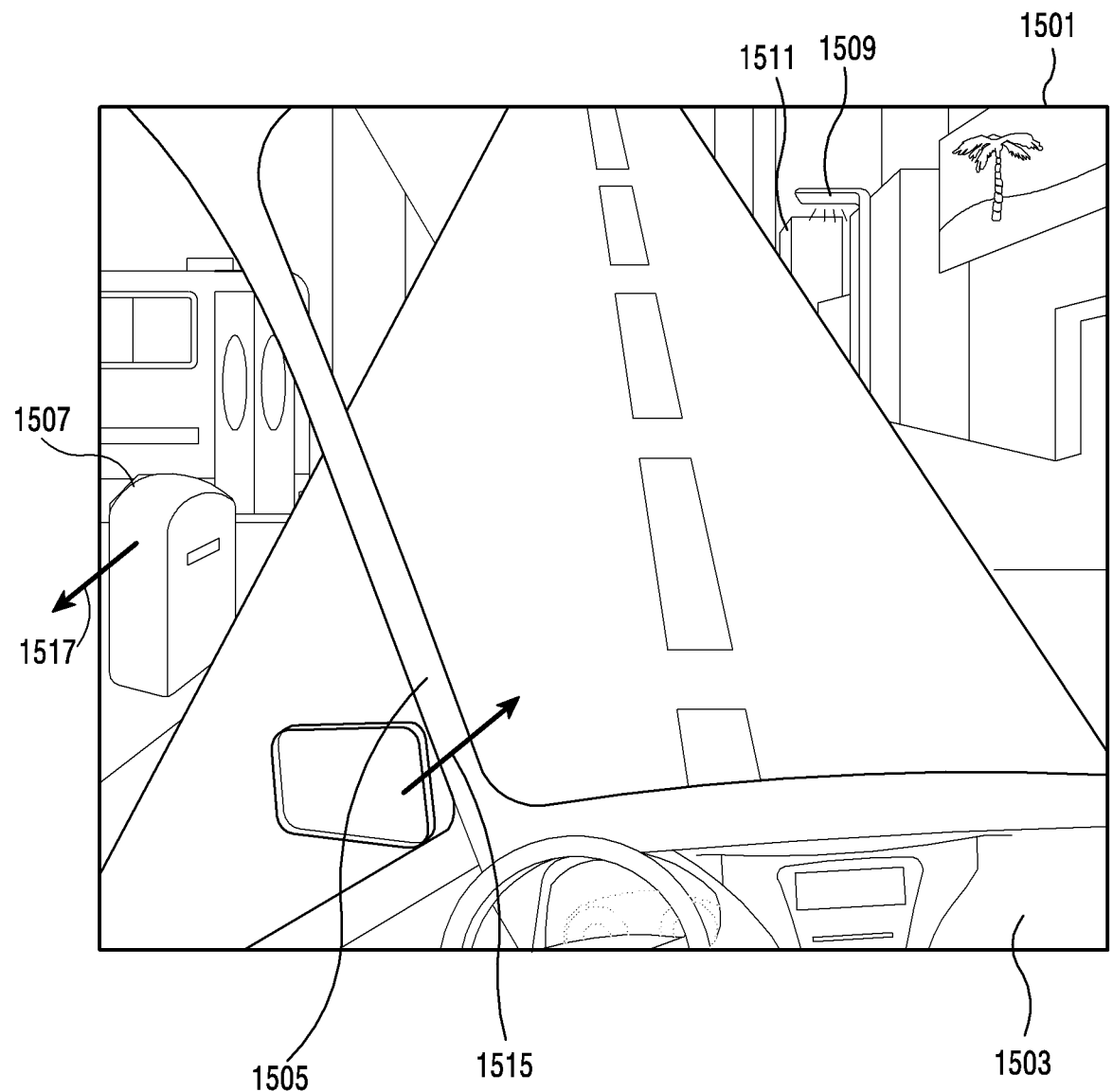
FIGS. 15 and 16 are example views illustrating a method for operating an external electronic device according to motion information according to an embodiment of the disclosure.
Figure 16:
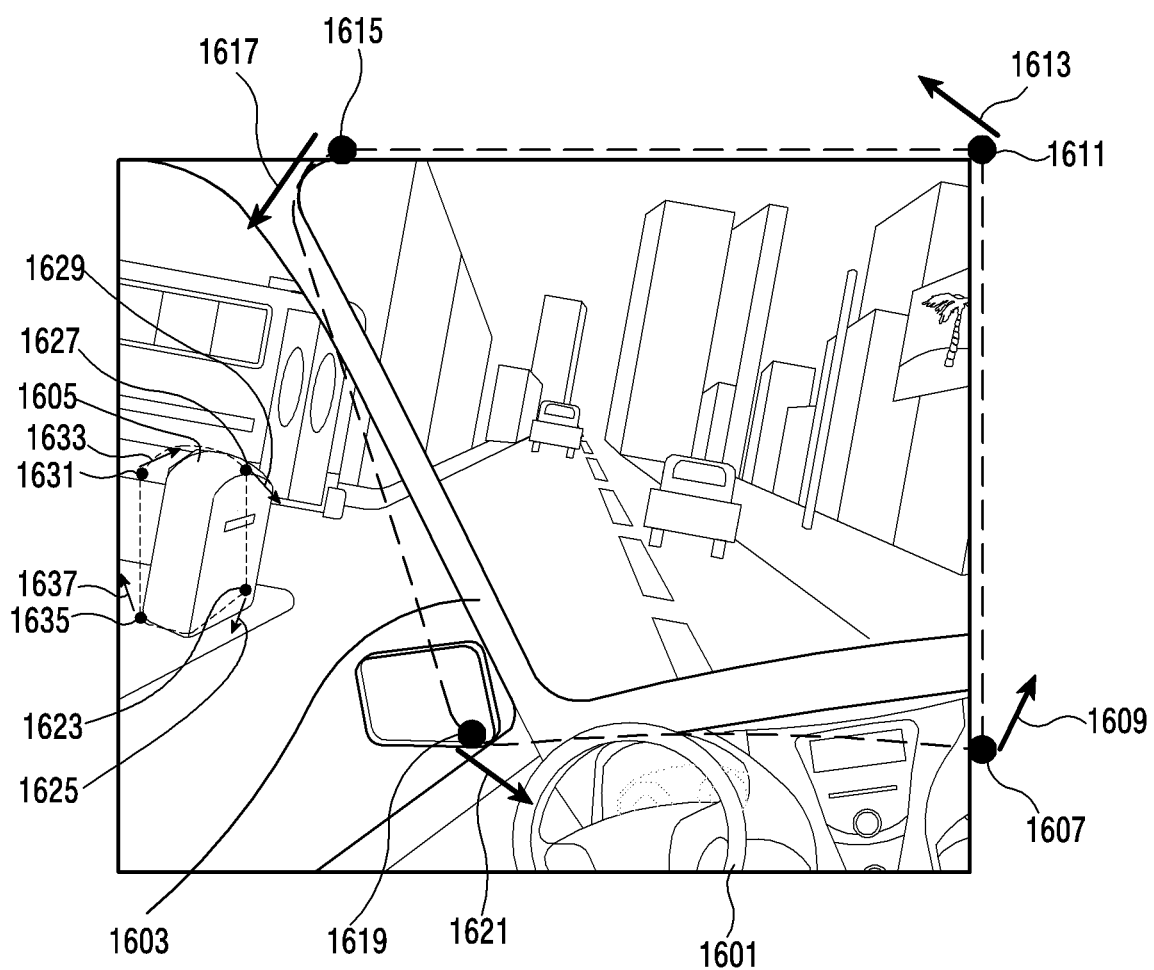

FIGS. 15 and 16 are example views illustrating a method for driving the external electronic device according to motion information according to an embodiment of the disclosure.

Referring to FIG. 15, a car dashboard 1503, a background frame 1505, a postbox 1507, a street lamp 1509, a building 1511, etc. are illustrated in a reference region 1501. As described above, a motion of the background frame 1505 may be detected, and the postbox 1507 having a motion vector 1517 having the opposite direction to a motion vector 1515 of the background frame 1505 may be determined as a reference object. As the motion of the background frame 1505 and the reference object are detected, the processor 210 may generate motion information based on a direction and a size of the motion vector 1515 of the background frame 1505. For example, the progressing direction of the image may be a moving direction of the car, and the motion information may include a situation in which a main character ascends while going through overpass, and travels at high speed. The street lamp 1509 and the building 1511 may be reference object candidate groups which are likely to be determined as a reference object in the next frame.

In an embodiment, the controller 1201 of the external electronic device 410 may control the first to fourth drivers 1207, 1209, 1211, 1213 by using the motion information received from the electronic device 201. For example, when the car in which the main character currently rides ascends, the controller 1201 may transmit, to the first driver 1207 and the second driver 1209, a control signal including a command to let hydraulic devices of the first driver 1207 and the second driver 1209 ascend. Accordingly, the first driver 1207 and the second driver 1209 ascend, such that the external electronic device 410 ascends, and the user riding on the external electronic device 410 experiences an ascending motion as in the image. In addition, the controller 1201 may transmit, to the third driver 1211 and the fourth driver 1214, a command to let hydraulic devices of the third driver 1211 and the fourth driver 1214 descend, in order to implement the ascending operation of the external electronic device 410. However, this should not be considered as limiting.

The car in which the main character rides in the image may descend although it is not illustrated in the drawing. When motion information including information indicating that the car descends in the image is received at the external electronic device 410, the controller 1201 may transmit, to the third driver 1211 and the fourth driver 1213, a command to let the hydraulic devices of the third driver 1211 and the fourth driver 1213 ascend. In addition, the controller 1201 may transmit, to the first driver 1207 and the second driver 1209, a control signal including a command to let the hydraulic devices of the first driver 1207 and the second driver 1209 descend. However, this should not be considered as limiting.

Referring to FIG. 16, in an embodiment, a background frame 1603 and a postbox 1605 are illustrated in a reference region 1601. As described above, the processor 210 may detect a motion of the background frame 1505, and may further detect motion vectors of reference points belonging to each object and the background frame 1603 when detecting motion vectors of the plurality of objects and the background frame 1603. For example, the processor 210 may detect a motion vector 1609 of a first reference point 1607 of a right lower corner of the background frame 1603, a motion vector 1613 of a second reference point 1611 of a right upper corner of the background frame 1603, a motion vector 1617 of a third reference point 1615 of a left upper corner of the background frame 1603, and a motion vector 1621 of a fourth reference point 1619 of a left lower corner of the background frame 1603. In addition, the processor 210 may detect a motion vector 1625 of a fifth reference point 1623 of a right lower corner of the postbox 1605, a motion vector 1629 of a sixth reference point 1627 of a right upper corner of the postbox 1605, a motion vector 1633 of a seventh reference point 1631 of a left upper corner of the postbox 1605, and a motion vector 1637 of an eighth reference point 1635 of a left lower corner of the postbox 1605.

When the motion vectors 1609, 1613, 1617, 1621 of the first to fourth reference points of the background frame 1605 and the motion vectors 1625, 1629, 1633, 1637 of the fifth to eighth reference points have the opposite directions, respectively, the processor 210 may determine the postbox 1605 as a reference object, and may generate motion information based on directions and sizes of the motion vectors 1609, 1613, 1617, 1621 of the first to fourth reference points. For example, the motion information may include a situation in which the car in which the main character currently rides turns left.

In an embodiment, the controller 1201 of the external electronic device 410 may control the first to fourth drivers 1207, 1209, 1211, 1213 by using the motion information received from the electronic device 201. For example, when the car in which the main character rides turns left, the controller 1201 may transmit, to the first to fourth drivers 1207 to 1213, a control signal including a command to let the hydraulic devices of the first driver 1207 and the third driver 1211 descend, and a command to let the hydraulic devices of the second driver 1209 and the fourth driver 1213 ascend. As the first driver 1207 and the third driver 1211 descend and the second driver 1209 and the fourth driver 1213 ascend, the external electronic device 410 may tilt toward the left, and the user riding on the external electronic device 410 may experience a motion of turning left as in the image. However, this should not be considered as limiting.

The car in which the main character rides may turn right in the image although it is not illustrated in the drawing. When motion information including information indicating that the car turns right in the image is received at the external electronic device 410, the controller 1201 may transmit, to the first to fourth drivers 1207 to 1213, a control signal including a command to let the hydraulic devices of the first driver 1207 and the third driver 1211 ascend, and a command to let the hydraulic devices of the second driver 1209 and the fourth driver 1213 descend. As the first driver 1207 and the third driver 1211 ascend and the second driver 1209 and the fourth driver 1213 descend, the external electronic device 410 may tilt toward the right, and the user riding on the external electronic device 410 may experience a motion of turning right as in the image. However, this should not be considered as limiting.

Figure 17:
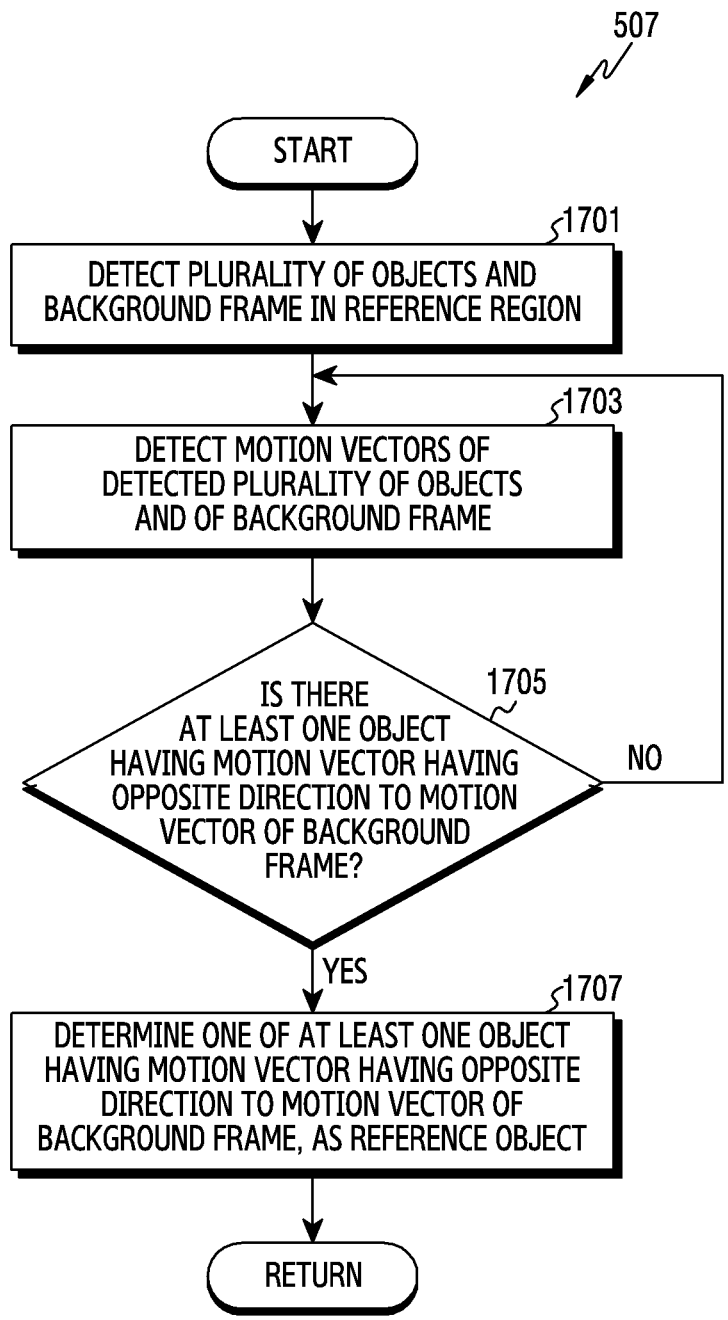
FIG. 17 is a flowchart illustrating a method for determining a reference object according to another embodiment of the disclosure.

FIG. 17 is a flowchart to illustrate a method for determining a reference object according to another embodiment of the disclosure.

Referring to FIGS. 11 and 17, in operation 1701, the processor 210 in an embodiment may detect a plurality of objects and a background frame in a reference region. As shown in FIG. 11, when the main character turns right in the image, the processor 210 may detect the car dashboard 1102, the background frame 1103, the external car 1107, the first tree 1104, the second tree 1105, the third tree 1106, etc. in the reference region 1101. However, this should not be considered as limiting, and the processor may detect all of the plurality of objects included in the image.

In an embodiment, the processor 210 may determine some of the detected plurality of objects as a reference object candidate group. That is, the processor 210 may determine the first to third trees 1104, 1105, 1106 having a high probability of being determined as the reference object as the reference object candidate group. The operation of determining the object candidate group may be omitted, or may be performed after a motion vector is detected (operation 1005).

In operation 1703, the processor 210 in an embodiment may detect motion vectors of the detected plurality of objects and of the background frame 1103. The processor may detect the motion vectors of the objects by comparing the N frame and the N+1 frame. For example, the processor 210 may detect the motion vector 1112 of the car dashboard 1102, the motion vector 1113 of the background frame 1103, the motion vector 1114 of the first tree 1104, the motion vector 1115 of the second tree 1105, the motion vector 1116 of the third tree 1106, and the motion vector 1117 of the external car 1107.

In operation 1705, the processor 210 in an embodiment may determine whether there is at least one object having a motion vector having the opposite direction to the motion vector 1113 of the background frame 1103, based on the motion vectors of the detected plurality of objects and the background frame 1103. That is, the processor 210 may determine whether there is at least one object having the motion vector having the opposite direction to the motion vector 1113 by comparing the motion vectors of the detected plurality of objects and the motion vector of the background frame 1103. When there is no object having the motion vector having the opposite direction to the motion vector 1113 of the background frame 1103, the processor 210 may repeatedly detect the motion vectors of the detected plurality of objects and of the background frame 1103.

In operation 1707, in an embodiment, when there is at least one object having the motion vector having the opposite direction to the motion vector 1113 of the background frame 1103, the processor 210 may determine one of the at least one object having the motion vector having the opposite direction to the motion vector of the background frame 1103 as the reference object. For example, when the background frame 1103 moves to the right as the car turns right, the first tree 1104 which relatively moves to the left may be determined as the reference object. However, the operation of determining the reference object as described above is not limited to FIGS. 10 and 17, and may be changed variously.

The processor 210 may execute operation 509 of FIG. 5 after operation 1707 (return). However, this should not be considered as limiting.

Figure 18:
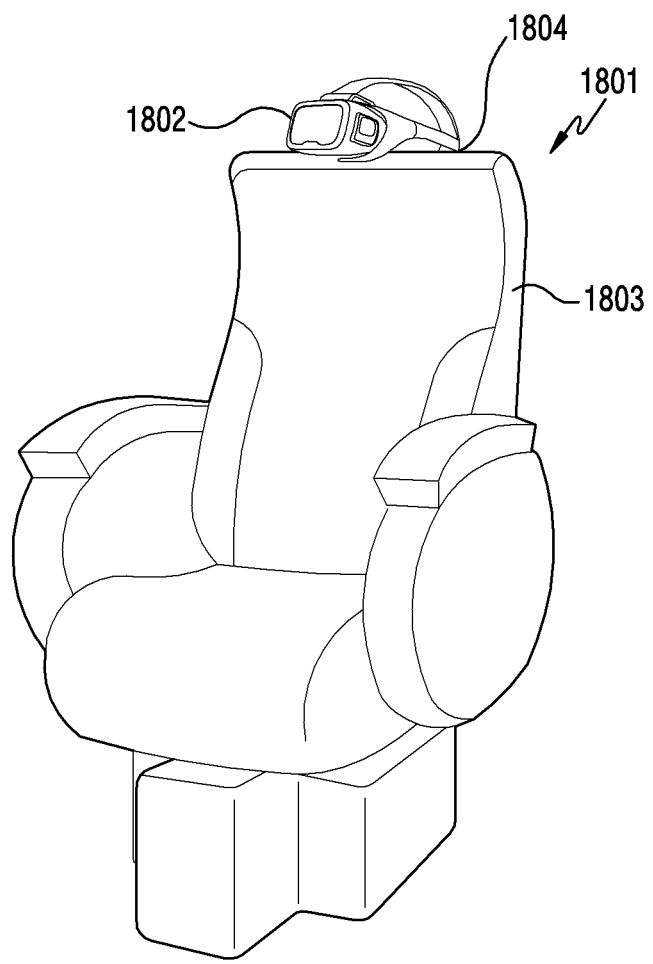
FIG. 18 is a concept view illustrating a method for generating and transmitting motion information according to various embodiments of the disclosure.

FIG. 18 is a concept view illustrating a method for generating and transmitting motion information according to various embodiments of the disclosure.

Referring to FIG. 18, in an embodiment, an electronic device 1801 may include a display 1802, a simulation unit 1803, and a connection unit 1804 physically connecting the display 1802 and the simulation unit 1803. In an embodiment, the display 1802 may have the same function as that of the electronic device 201 described above, and the simulation unit 1803 may have the same function as that of the external electronic device 410 described above. The electronic device 1801 may be a device into which the above-described electronic device 201 and the above-described external electronic device 410 are integrated. The connection unit 1804 may have a part of a body thereof inserted into the simulation unit 1803, and may have the body drawn out therefrom when a user wears the display 1802. That is, the connection unit 1804 may have its length adjusted according to a wearing state of the user.

According to an embodiment of the disclosure, the display 1802 may be removably connected to the electronic device 1801. That is, the user may connect the display 1802 to the simulation unit 1803 or the connection unit 1803 only when viewing a content with the simulation unit 1803.

The electronic device 1801 may operate in the same way as operations 501 to 507 of FIG. 5 described above. However, the electronic device 1801 may generate motion information for controlling driving of the electronic device 1801 based on a determined reference object unlike operation 509. That is, the display 1802 may generate motion information for controlling driving of the simulation unit 1803, and the display 1802 may transmit the motion information to the simulation unit 1803 through an electric connecting means. The simulation unit 1803 may provide a physical simulation effect to the user according to the received motion information.

According to an embodiment of the disclosure, the processor 210 of the electronic device 201 shown in FIG. 4 may determine whether to drive the external electronic device 410 according to whether a user wears the electronic device 201. The processor 210 of the electronic device 201 may transmit the motion information to the external electronic device 410 only when the user wears the electronic device 201, and the external electronic device 410 may be driven only when the user wears the electronic device 201 When the user of the electronic device 201 takes off the electronic device 201 or wrongly wears, but the external electronic device 410 is driven, the user may be injured. Accordingly, the external electronic device 410 may be driven only when the user wears the electronic device 201 rightly in a specified method, so that an injury of the user can be prevented. However, this should not be considered as limiting.

Specifically, in an embodiment, the electronic device 201 may detect the user's wearing the electronic device 201 through at least one sensor module 240 functionally connected with the electronic device 201. For example, the processor 210 of the electronic device 201 may detect whether the user wears the electronic device 201 by using the proximity sensor 240G or the grip sensor 240F. In addition, the processor 210 of the electronic device 201 may detect whether the user wears the electronic device 201 by detecting at least one of IR recognition, pressure recognition, a change in capacitance (or dielectric constant) according to user's wearing. However, this should not be considered as limiting.

In an embodiment, the processor 210 of the electronic device 201 may transmit, to the external electronic device 410, motion information generated when the user's wearing the electronic device 210 is detected. Accordingly, the user may receive the image provided by the electronic device 201 and the motion effect provided by the external electronic device 410, simultaneously, only when the user wears the electronic device 210.

In addition, in an embodiment, the processor 210 of the electronic device 201 may detect the user's taking off the electronic device 210 that the user has worn. When the processor 210 of the electronic device 201 detects the user's taking off the electronic device 210 while reproducing the image, the processor 210 may stop transmitting the motion information to the external electronic device 410 or may transmit a driving stop command to the external electronic device 410. Accordingly, the external electronic device 410 may stop being driven when the user takes off the electronic device 210.

In addition, in an embodiment, when there is an error in the user's wearing the electronic device 210 while the image is being reproduced, the processor 210 of the electronic device 201 may stop transmitting the motion information to the external electronic device 410 or may transmit a driving stop command to the external electronic device 410. The error in the user's wearing the electronic device 210 may be caused when the user attaches the electronic device 210 to a part of the body, but does not wear on the body part in a specified method, or when the electronic device 201 worn on the body part is released from the body part in part during driving. However, this should not be considered as limiting.

According to an embodiment of the disclosure, the electronic device 1801 illustrated in FIG. 18 may determine whether to drive the simulation unit 1803 according to whether the user wears the display 1802 in the same way as described above. The display 1802 may transmit motion information to the simulation unit 1803 only when the user wears the display 1802, and the simulation unit 1803 may be driven only when the user wears the display. Specifically, the display 1802 may detect the user's wearing the display 1802 through at least one sensor module functionally connected with the display 1802. The display 1802 may transmit, to the simulation unit 1803, motion information generated when the user's wearing the display 1802 is detected. Accordingly, the user may receive an image provided by the display 1802 and a motion effect provided by the simulation unit 1803, simultaneously, only when the user wears the display 1802.

In addition, in an embodiment, the display 1802 may detect the user's taking off the display 1802 that the user has worn. When the display 1802 detects the user's taking off the display 1802 while reproducing an image, the display 1802 may stop transmitting the motion information to the simulation unit 1803, or may transmit a driving stop command to the simulation unit 1803. In addition, in an embodiment, when there is an error in the user's wearing the display 1802 while the image is being reproduced, the display 1802 may stop transmitting the motion information to the simulation unit 1803, or may transmit a driving stop command to the simulation unit 1803. However, this should not be considered as limiting.

A method according to various embodiments of the disclosure may include: detecting a content; detecting a progressing direction of an image included in the content as the content is detected; detecting a reference region including the detected progressing direction of the image; determining a reference object in the detected reference region; and generating motion information for controlling driving of an external electronic device, based on the determined reference object.

In an embodiment, the method may further include reproducing the detected content as the content is detected.

In an embodiment, the method may further include transmitting the motion information to the external electronic device.

In an embodiment, detecting the progressing direction of the image may include: detecting an N frame and an N+1 frame of the image included in the content; detecting a plurality of difference motion vectors by comparing the detected N frame and N+1 frame; detecting a plurality of difference motion vectors which are symmetrical to each other from among the detected plurality of difference motion vectors; and detecting the reference region including the plurality of difference motion vectors which are symmetrical to each other.

In an embodiment, determining the reference object may include: detecting a plurality of objects and a background frame in the reference region; detecting a motion of the background frame; detecting motion vectors of the plurality of objects and of the background frame as the motion of the background frame is detected; detecting at least one object having a motion vector having the opposite direction to the motion vector of the background frame; and determining one of the at least one object having the motion vector having the opposite direction to the motion vector of the background frame, as the reference object.

In an embodiment, the method may further include replacing the determined reference object with another object of the at least one object having the motion vector having the opposite direction to the motion vector of the background frame as the image progresses.

In an embodiment, determining the reference object may include: detecting a plurality of objects and a background frame in the reference region; detecting motion vectors of the detected plurality of objects and of the background frame; determining whether there is at least one object having a motion vector having the opposite direction to the motion vector of the background frame; and, when there is the at least one object having the motion vector having the opposite direction to the motion vector of the background frame, determining one of the at least one object having the motion vector having the opposite direction to the motion vector of the background frame, as the reference object.

In an embodiment, generating the motion information may include: detecting a direction and a size of a motion vector of a background frame as the reference object is detected; and generating motion information for controlling driving of the external electronic device, based on the direction and the size of the motion vector of the background frame.

In an embodiment, the motion information may include a command to let a driver of the external electronic device ascend or descend.

In an embodiment, the external electronic device may be a simulation device that a user is able to ride in.

In an embodiment, the image may include a 360-degree image.

In an embodiment, the method may further include correcting a distortion of the detected reference region.

A method according to various embodiments of the disclosure may 30 include: detecting a content; detecting a progressing direction of an image included in the content as the content is detected; detecting a reference region including the detected progressing direction of the image; determining a reference object in the detected reference region; and generating motion information for controlling driving of the electronic device based on the determined reference object.

The disclosure has been described with reference to various example embodiments thereof. It will be understood by a person skilled in the art that the disclosure can be implemented in modified forms without departing from the essential characteristics of the disclosure. Therefore, disclosed embodiments should be considered from a descriptive perspective, not from a limited perspective. The scope of the disclosure is defined not by the detailed description but by the appended claims, and all differences within the scope should be understood as being included in the disclosure.

What is claimed is:

1. An operation method of an electronic device, the method comprising:
    detecting a content;
    detecting a progressing direction of an image included in the content as the content is detected;
    detecting a reference region comprising the detected progressing direction of the image wherein the detecting the reference region further comprises:
        detecting an N frame and an N+1 frame of the image included in the content;
        detecting a plurality of difference motion vectors by comparing the detected N frame and N+1 frame;
        detecting a plurality of difference motion vectors which are symmetrical to each other from among the detected plurality of difference motion vectors; and
        detecting the reference region including the plurality of difference motion vectors which are symmetrical to each other;
    determining a reference object in the detected reference region; and
    generating motion information for controlling driving of an external electronic device, based on the determined reference object.

2. The method of claim 1, wherein determining the reference object comprises:
    detecting a plurality of objects and a background frame in the reference region;
    detecting a motion of the background frame;
    detecting motion vectors of the plurality of objects and of the background frame as the motion of the background frame is detected;

detecting at least one object having a motion vector having the opposite direction to the motion vector of the background frame; and determining one of the at least one object having the motion vector having the opposite direction to the motion vector of the background frame, as the reference object.

3. The method of claim 1, further comprises, reproducing the detected content as the content is detected.

4. The method of claim 1, further comprises, transmitting the motion information to the external electronic device.

5. The method of claim 1, wherein the determining further comprises:

detecting a plurality of objects and a background frame in the reference region;

detecting motion vectors of the detected plurality of objects and of the background frame;

determining whether there is at least one object having a motion vector having the opposite direction to the motion vector of the background frame; and when there is the at least one object having the motion vector having the opposite direction to the motion vector of the background frame, determining one of the at least one object having the motion vector having the opposite direction to the motion vector of the background frame, as the reference object.

6. The method of claim 1, further comprises replacing the determined reference object with another object of the at least one object having the motion vector having the opposite direction to the motion vector of the background frame as the image progresses.

7. An electronic device comprising:

a communication circuit functionally connected to the electronic device; and a processor, wherein the processor is configured to:

detect a content;

detect a progressing direction of an image included in the content as the content is detected;

detect a reference region comprising the detected progressing direction of the image wherein the detecting the reference region further comprises:

detect an N frame and an N+1 frame of the image included in the content;

detect a plurality of difference motion vectors by comparing the detected N frame and N+1 frame;

detect a plurality of difference motion vectors which are symmetrical to each other from among the detected plurality of difference motion vectors; and detect the reference region including the plurality of difference motion vectors which are symmetrical to each other;

determine a reference object in the detected reference region; and generate motion information for controlling driving of an external electronic device, based on the determined reference object.

8. The electronic device of claim 7, wherein the processor is configured to reproduce the detected content as the content is detected.

9. The electronic device of claim 7, wherein the communication circuit is configured to transmit the motion information to the external electronic device.

10. The electronic device of claim 7, wherein the processor is configured to:

detect a plurality of objects and a background frame in the reference region;

detect a motion of the background frame;

detect motion vectors of the plurality of objects and of the background frame as the motion of the background frame is detected;

detect at least one object having a motion vector having the opposite direction to the motion vector of the background frame; and determine one of the at least one object having the motion vector having the opposite direction to the motion vector of the background frame, as the reference object.

11. The electronic device of claim 7, wherein the processor is configured to:

detect a plurality of objects and a background frame in the reference region;

detect motion vectors of the detected plurality of objects and of the background frame;

determine whether there is at least one object having a motion vector having the opposite direction to the motion vector of the background frame; and when there is the at least one object having the motion vector having the opposite direction to the motion vector of the background frame, determine one of the at least one object having the motion vector having the opposite direction to the motion vector of the background frame, as the reference object.

12. The electronic device of claim 7, wherein the processor is configured to:

detect a direction and a size of a motion vector of a background frame as the reference object is detected; and generate motion information for controlling driving of the external electronic device, based on the direction and the size of the motion vector of the background frame.

13. The electronic device of claim 7, wherein the external electronic device is a simulation device that a user is able to ride in.

14. The electronic device of claim 7, wherein the image comprises a 360-degree image.

15. The electronic device of claim 7, wherein the processor is configured to correct a distortion of the detected reference region.

16. The electronic device of claim 10, wherein the processor is configured to replace the determined reference object with another object of the at least one object having the motion vector having the opposite direction to the motion vector of the background frame as the image progresses.

17. The electronic device of claim 12, wherein the motion information comprises a command to let a driver of the external electronic device ascend or descend.

18. An electronic device configured to:

detect a content;

detect a progressing direction of an image included in the content as the content is detected;

detect a reference region comprising the detected progressing direction of the image wherein the detecting the reference region further comprises:

detect an N frame and an N+1 frame of the image included in the content;

detect a plurality of difference motion vectors by comparing the detected N frame and N+1 frame;

detect a plurality of difference motion vectors which are symmetrical to each other from among the detected plurality of difference motion vectors; and detect the reference region including the plurality of difference motion vectors which are symmetrical to each other;

determine a reference object in the detected reference region; and generate motion information for controlling driving of the electronic device based on the determined reference object.

* * * * *